(12) United States Patent
Vaisberg et al.

(10) Patent No.: US 6,876,760 B1
(45) Date of Patent: Apr. 5, 2005

(54) CLASSIFYING CELLS BASED ON INFORMATION CONTAINED IN CELL IMAGES

(75) Inventors: Eugeni A. Vaisberg, Foster City, CA (US); Daniel A. Coleman, San Mateo, CA (US)

(73) Assignee: Cytokinetics, Inc., South San Francisco, CA (US)

(*) Notice: Subject to any disclaimer, the term of this patent is extended or adjusted under 35 U.S.C. 154(b) by 751 days.

(21) Appl. No.: 09/729,754

(22) Filed: Dec. 4, 2000

(51) Int. Cl.[7] .............................................. G06K 9/00
(52) U.S. Cl. ............................ 382/129; 435/6; 382/133
(58) Field of Search ................................. 382/128, 129, 382/130, 131, 132, 133, 134; 435/6, 4, 9, 7.1, 7.24, 172, 287.1, 440, 518, 325, 419

(56) References Cited

U.S. PATENT DOCUMENTS

| | | | |
|---|---|---|---|
| 4,818,710 A | | 4/1989 | Sutherland et al. |
| 4,922,092 A | | 5/1990 | Rushbrooke et al. |
| 5,016,283 A | * | 5/1991 | Bacus et al. ................. 382/129 |
| RE34,214 E | | 4/1993 | Carlsson et al. |
| 5,281,517 A | * | 1/1994 | Bacus et al. .................... 435/6 |
| 5,287,272 A | | 2/1994 | Rutenberg et al. |
| 5,326,691 A | | 7/1994 | Hozier |
| 5,355,215 A | | 10/1994 | Schroeder et al. |
| 5,526,258 A | | 6/1996 | Bacus |
| 5,710,022 A | * | 1/1998 | Zhu et al. ................... 435/69.1 |
| 5,733,721 A | | 3/1998 | Hemstreet, III et al. |
| 5,768,412 A | | 6/1998 | Mitsuyama et al. |
| 5,777,888 A | | 7/1998 | Rine et al. |
| 5,893,095 A | | 4/1999 | Jain et al. |
| 5,962,520 A | | 10/1999 | Smith et al. |
| 5,985,549 A | * | 11/1999 | Singer et al. ................... 435/6 |
| 6,078,681 A | * | 6/2000 | Silver ......................... 382/133 |

(Continued)

FOREIGN PATENT DOCUMENTS

| | | |
|---|---|---|
| EP | 0317139 | 4/1988 |
| WO | WO 93/21511 | 10/1993 |
| WO | WO 94/11841 | 5/1994 |
| WO | WO9522749 | 8/1995 |
| WO | WO 96/09605 | 3/1996 |
| WO | WO 97/43732 | 11/1997 |
| WO | WO 99/05323 | 2/1999 |
| WO | WO 00/65472 | 11/2000 |
| WO | WO 00/70528 A2 | 11/2000 |

OTHER PUBLICATIONS

Russ, J.C., "The Image Processing Handbook," Second Edition, Boca Raton: CRC Press, 1995, pp. 169–474 and 457–461.

Lu et al., "Hierarchical Shape Recognition Using Polygon Approximation and Dynamic Alignment," IEEE Paper CH2561–9, vol. 2, pp. 976–979, 1988.

Ravi Kapur, et al., "Design and Fabrication of Spatially Controlled Miniaturized Organ Systems From Stem Cells", U.S. Provisional Patent Application No.: 60/127,339, Filed Apr. 1, 1999, 21 pages.

(Continued)

*Primary Examiner*—Bhavesh M. Mehta
*Assistant Examiner*—Abolfazl Tabatabai
(74) *Attorney, Agent, or Firm*—Beyer Weaver & Thomas, LLP

(57) ABSTRACT

Image analysis methods analyze images of cells and place the cells in particular cell cycle phases based upon certain features extracted from the images. The methods can also quantify the total amount of DNA in a cell based on specific features such as fluorescence intensity from fluorescent molecules that bind to DNA. Further, the methods can characterize a cell as mitotic or interphase based on chosen parameters such as the variance in intensity observed in a cell image and/or the size of a region containing DNA. In one example, image analysis methods can classify the cell into one of the following five phases: $G_1$, S, $G_2$, telophase, and an early stage mitotic phase comprised of prophase, metaphase, and anaphase.

108 Claims, 21 Drawing Sheets

U.S. PATENT DOCUMENTS

| | | | |
|---|---|---|---|
| 6,083,763 | A | 7/2000 | Balch |
| 6,146,830 | A | 11/2000 | Friend et al. |
| 6,169,816 | B1 | 1/2001 | Ravkin |
| 6,222,093 | B1 | 4/2001 | Marton et al. |
| 6,345,115 | B1 | 2/2002 | Ramm et al. |
| 6,615,141 | B1 * | 9/2003 | Sabry et al. ............... 702/19 |
| 6,658,143 | B2 | 12/2003 | Hansen et al. |

OTHER PUBLICATIONS

Terri Adams, et al., "Cell Patterning on Glass and Polymeric Substrates", U.S. Provisional Patent Application No.: 60/138,119, filed Jun. 7, 1999, 17 pages.

Uria JA, Stahle–Backdahl M, Seiki M, Fueyo A, Lopez–Otin C, "Regulation of Collagenase–3 Expression in Human Breast Carcinomas in Mediated by Stromal–Epithelial Cell Interactions", Cancer Res Nov. 1, 1997;57 (21):4882–8, Abstract.

"An Integrated Method to Determine Epithelial Transport and Bioactivity of Oral Drug Candidates in Vitro," *Pharmaceutical Research*, vol. 13, No. 1, pp. 23–27, 1996.

Sunblad et al., "The use of image analysis and automation for measuring mitotic index in apical confier meristems", © Oxford University Press 1998, Journal of Experimental Botany, vol. 49, No. 327, pp. 1749–1756.

Cseke, I., "A Fast Segmentation Scheme for White Blood Cell Images" (1992) IEEE, pp. 530–533.

Serbouti, S., et al., "Image Segmentation and Classification Methods to Detect Leukemias", (1991) Annual Int'l Conf. of IEEE Eng. In Medicine & Biology Soc., vol. 13, No. 1, pp. 0260–0261.

Hofland et al., "Role of Tumor–Derived Fibroblasts in the Growth of Primary Cultures of Human Breast–Cancer Cells: Effects of Epidermal Growth Factor an the Somatostatin Analogue Octreotide", 1995, Int. J. Cancer: 60, 93–93.

Stearns et al., Interleukin 10 (IL–10) Inhibition of Primary Human Prostate Cell–induced Angiogenesis: IL–10 Stimulation of Tissue Inhibitor of Metalloproteinase–1 and Inhibition of Matrix Metalloproteinase (MMP)–2/MMP–9 Secretion, 1999, Clin. Can. Res. 5:189–96.

Takayama et al., "Patterning cells and their environments using multiple laminar fluid flows in capillary networks", Proc. Natl., Acad. Sci. Vol. 96, pp. 5545–5548, May 1999.

U.S. Provisional application No. 60/127,339, Kapur et al., filed Apr. 1, 1999.

U.S. Provisional application No. 60/138,119, Adams et al., filed Jun. 7, 1999.

Hartwell et al., "Integrating Genetic Approaches into the Discovery of Anticancer Drugs", Science, vol. 278, Nov. 7, 1997, pp. 1064–1068, XP002916842.

Ng et al., "Evaluating Multi–Dimensional Indexing Structures for Images Transformed by Principal Component Analysis", Dept. of Computer Science, University of British Colombia, Vancouver, B.C. V6T 1Z4, Canada, Feb. 1, 1996, XP000642562.

Boland et al. "Automated Recognition of Patterns Characterisitc of Subcellular Structures in Fluorescence Microscopy Images", Wiley–Liss, Inc., pp. 366–375, Cytometry 33:366–375 (1998).

* cited by examiner

CLASSIFYING CELLS BASED ON INFORMATION CONTAINED IN CELL IMAGES

CROSS-REFERENCE TO RELATED PATENT APPLICATIONS

This application claims priority from the following co-pending U.S. patent applications, U.S. patent application Ser. No. 09/310,879 by Vaisberg et al., and titled DATABASE METHOD FOR PREDICTIVE CELLULAR BIOINFORMATICS; U.S. patent application Ser. No. 09/311,996 by Vaisberg et al., a nd titled DATABASE SYSTEM INCLUDING COMPUTER FOR PREDICTIVE CELLULAR BIOINFORMATICS; and U.S. patent application Ser. No. 09/311,890 by Vaisberg et al., and titled DATABASE SYSTEM FOR PREDICTIVE CELLULAR BIOINFORMATICS. Each of these applications was filed on May 14, 1999 and is incorporated herein by reference for all purposes.

BACKGROUND OF THE INVENTION

The present invention pertains to image analysis methods used to classify cells based upon their state in the cell grow th and division cycle.

Many interesting bio logical conditions affect or are affected by changes in cell cycle status. For example, some particular condition may cause cells to divide less frequently than normal. Another condition may cause cells to reside in the DNA synthesis state for longer than a normal amount of time. Biological "conditions" of interest to researchers include disease states, normal unperturbed states, quiescent states, states induced by exogenous agents, etc. Valuable insight may be gained by inducing a biological condition through a genetic manipulation, exposure to a particular agent (e.g., a compound, radiation, a field, etc.), deprivation of required substance, and other perturbations.

In drug discovery work, valuable information can be obtained by understanding how a potential therapeutic affects cell growth and division. Often, this information gives some indication of the mechanism of action associated with the compound. For example, a particular class of drugs or genetic manipulations may arrest cell growth at the G2 stage (second gap phase). The drugs of this class are known to act via a particular set of mechanisms of action. Another class of drugs or genetic manipulations arrests cells while in mitosis and acts via a different mechanisms. The ability to quickly determine whether a population of cells is arrested in G2 or mitosis (or some other stage) provides a valuable tool in assessing the mechanism of action of an uncharacterized compound that has been tested on the population of cells.

Commonly, the stage of a given cell in the cell growth and division cycle is determined by measuring the quantity of DNA in the cell. Most cell components are made continuously throughout the so-called "interphase" period, between cell divisions. However, DNA synthesis is an exception. DNA in the cell nucleus is replicated only during a limited portion of the interphase, deemed the "S" phase of the cell cycle (for "synthesis"). The other to distinct stage of the cycle is the cell-division phase, which includes both nuclear division (mitosis) and the cytoplasmic division (cytokinesis) that follows. The entire cell-division phase is denoted as the "M" phase (for "mitosis"). This leaves the period between the M phase and the start of DNA synthesis (the S phase), which is called the "$G_1$" phase (first gap phase), and the period between the completion of DNA synthesis and the next M phase, which is called the "$G_2$" phase. Interphase is thus composed of sequential $G_1$, S, and $G_2$ phases, and can comprise 90% or more of the total cell cycle time.

FIG. 1B is a simple graph depicting how the quantity of nuclear DNA in a cell nucleus changes with cell cycle. As shown, when the cell cycle begins at the $G_1$ phase, the total quantity of nuclear DNA in the cell has a value 2N. That quantity remains constant for the duration of $G_1$. At the onset of the S phase, the total quantity of nuclear DNA begins to increase and steadily grows. By the end of the S phase (beginning of the $G_2$ phase), the total quantity of nuclear DNA has reached a value of 4N. This quantity remains constant throughout the $G_2$ phase and mitosis, until two daughter cells are formed.

Today, cell-cycle analyses are commonly performed using fluorescence-activated cell analysis. This process employs a machine in which a cell suspension is forced through a fine nozzle and an optical measurement is made and recorded for each individual cell as it briefly passes through a window. Initially, a growing cell population is treated with a fixative (to arrest cell division and make the membranes permeable) and contacting them with a dye that becomes fluorescent only when it binds to DNA. When a cell is treated in this way, the intensity with which it fluoresces is approximately proportional to the amount of DNA that it contains. By passing such cells through a fluorescence analyzer, one can rapidly determine the relative fluorescence of the large number of cells, and, therefore, their relative amounts of DNA. Those cells with the least amount of DNA are in the $G_1$ phase, those with double this amount are in the $G_2$ or M phase, while cells in the S phase have intermediate amounts. The lengths of the $G_1$, $G_2$ plus M, and S phases of the cell cycle can be calculated from the fraction of cells in each of these categories. This process is described in detail in various sources including Alberts et al. "Molecular Biology of the Cell" Garland Publishing, Inc. 1993.

Unfortunately, information provided by the fluorescence analyzer is too coarse for many applications. Most importantly, the analyzer only reads out total DNA content per cell; it is unable to distinguish between mitotic cells and $G_2$ phase cells. Therefore, it would be desirable to have an improved process for classifying cells in a manner that distinguishes the interphase and mitotic states.

SUMMARY OF THE INVENTION

The present invention addresses this need by providing methods and apparatus that analyze images of cells and categorize the cells in particular cell cycle phases based upon certain features extracted from the images. Independently of this, the invention can quantify the total amount of DNA in a cell based on specific features of an image such the as fluorescence intensity generated from fluorescent molecules that bind to DNA. The invention can also characterize a cell as mitotic or interphase based on morphological and textual parameters such as the variance of the pixel intensities observed in a cell image and/or the size of a region containing DNA. Of particular interest, the image analyss methods of this invention can accurately classify a cell into one of the following five phases: $G_1$, S, $G_2$, early mitotic stages (prophase, prometaphase, metaphse), and late mitotic stages (anaphase and telophase).

One aspect of this invention provides a method of estimating an amount of DNA in a cell. The method may be characterized by the following sequence: (a) receiving an image of the cell, in which local values of a DNA image parameter correspond to amounts of DNA at the locations within the cell shown on the image; and (b) estimating a total value of the DNA image parameter taken over a region of the cell where DNA is deemed to be present.

The DNA image parameter indicates the amount or concentration of DNA at any given location in the image. In one example, the cell is treated with an agent that selectively associates with DNA and emits a signal recorded as the DNA image parameter. An example is a stain or other material that selectively binds to DNA. The DNA image parameter may be a light or radiation intensity, such as an electromagnetic radiation intensity provided at a particular wavelength or range of wavelengths.

Estimating the total value of the DNA image parameter may be accomplished by various techniques such as summing a per pixel value of the DNA image parameter over all pixels in the region of the cell where DNA is deemed to be present. In one example, the per pixel value of the DNA image parameter comprises a corrected per pixel intensity value such as the difference of an absolute pixel intensity value and an image background level. Note that the estimated total value of the DNA image parameter should correspond to the actual amount of DNA in the cell under consideration. Thus, the estimated total value of the DNA image parameter may be converted to an estimated value of the total DNA in the region where DNA is deemed to be present.

The method may also classify the cell into a cell cycle state based on the estimated value of total DNA. Classification may employ any of a number of available techniques such as applying a mixture model to operate on estimated values of total DNA for a population of cells.

Another aspect of this invention pertains to an image analysis apparatus for estimating the amount of DNA in a cell. The apparatus may be characterized by the following features: (a) a memory or buffer adapted to store, at least temporarily, an image of the cell, in which image local values of a DNA image parameter correspond to amounts of DNA at the locations within the cell shown on the image; and (b) a processor configured or designed to estimate a total value of the DNA image parameter taken over at least a region of the cell where DNA is deemed to be present. Preferably, the apparatus also includes an interface adapted to receive the image of the cell. In some embodiments, the system also includes an image acquisition system that produces the image of the cell. The DNA image parameter may be obtained and analyzed as described above. The analysis is generally performed by the processor in conjunction with the memory.

Another aspect of the invention provides a method of distinguishing between mitotic and interphase cells. The method may be characterized by the following sequence: (a) receiving an image of a cell; (b) from the image, extracting values of one or more mitosis indicator parameters that correspond to a cell division state of the cell; and (c) classifying the cell as either mitotic or interphase based upon the extracted values of the one or more mitosis indicator parameters. To obtain the necessary mitosis indicator parameters, the cell should be treated with an agent that selectively associates with DNA and emits a signal recorded as a location of DNA within the cell. Stains and other materials of the type described above may be employed for this purpose.

Various types of mitosis indicator parameters will work. Examples include a variance in DNA concentration within the cell, the size of a region of DNA within the cell, and a maximal concentration of DNA within the cell. The mitosis indicator parameter or parameters is/are chosen to indicate the degree to which DNA within the cell has condensed into chromosomes or the degree to which DNA within the cell has separated. DNA that has concentrated into one or more discrete locations suggests that mitosis is occurring. A specific set of parameters for this purpose include (1) the average DNA concentration values and (2) the area occupied by DNA.

Various suitable techniques for classifying the cell as either mitotic or interphase exist. One preferred approach employs a mixture model to operate on the values of the one or more mitosis indicator parameters for a population of cells. In a refinement of this method, the algorithm classifies a mitotic cell as pre or post-anaphase.

Another aspect of this invention pertains to an image analysis apparatus for distinguishing between mitotic and interphase cells. This apparatus may be characterized by the following features: (a) a memory or buffer adapted to store, at least temporarily, an image of a cell; and (b) a processor configured or designed to analyze said image in manner that extracts values of one or more mitosis indicator parameters that correspond to a cell division state and classifies the cell as either mitotic or interphase based upon the extracted values of the one or more mitosis indicator parameters. Preferably, the apparatus includes an interface adapted to receive the image of the cell, and it may also include an image acquisition system that produces the image of the cell. The mitosis indicator parameters discussed above may be used by the processor to analyze and classify cell images.

Yet another aspect of the invention pertains to a method of classifying a cell based on an image of that cell. This method may be characterized by the following sequence: (a) receiving an image of a cell showing locations where nuclear DNA exists within the cell and also showing local amounts of the nuclear DNA; (b) from the image, extracting values of one or more mitosis indicator parameters that correspond to a cell division state of the cell; (c) from the image, estimating a total amount of DNA in the cell; and (d) classifying the cell into a cell cycle phase based upon the one or more mitosis indicator parameters and total amount of DNA. This technique can generally classify a cell into any of the $G_1$, S, $G_2$, and mitotic cell cycle phases. In preferred embodiments, the technique can more specifically classify a cell into any the $G_1$, S, $G_2$, pre-anaphase mitotic, and post-anaphase mitotic phases.

Typically, the operation of classifying the cell involves comparing the amount of DNA and/or the one or more mitosis indicator parameters to a model, such as a mixture model, providing boundaries between certain cell cycle phases in parameter space. To this end, the technique may also generate the model from a population of cell images. From these images, the one or more mitosis indicator parameters are extracted and the amount of DNA is estimated. The population used to generate the model may be an aggregation of cell images taken from multiple sources such as multiple wells on an assay plate.

Still another aspect of the invention pertains to an image analysis apparatus for distinguishing between mitotic and interphase cells. This apparatus may be characterized by the following features: (a) a memory or buffer adapted to store, at least temporarily, an image of a cell showing locations where nuclear DNA exists within the cell and also showing local amounts of the nuclear DNA; and (b) a processor configured or designed to (i) analyze said image in manner that extracts values of one or more mitosis indicator parameters that correspond to a cell division state, (ii) estimate a total amount of DNA in the cell, and (iii) classifying the cell into a cell cycle phase based upon the one or more mitosis indicator parameters and total amount of DNA.

It is often important to employ a sufficiently large and diverse population of cell images to effectively develop a classification/discrimination model. Aspects of the invention address this concern. Specifically, the invention provides a suitable method for determining parameters for classifying cells into stages of the cell cycle. This method involves the following operations: (a) obtaining cell images for a population of cells; (b) organizing the cell images based upon at least one of (i) an amount of DNA in the cells and (ii) a mitotic discriminator for the cell images; and (c) from the resulting organization of cell images, determining the parameters for classifying the cells into stages of the cell cycle. In some instances, the population of cells includes cells treated under control conditions. In other instances, the population of cells includes a first set of cells treated with a first concentration of a biologically active agent and a second set of cells treated with a second concentration of the biologically active agent. This is referred to as a dilution group. Sometimes the population of cells includes both a control group and a dilution group. In a preferred embodiment, determining the parameters for classifying the cells into stages of the cell cycle involves applying a mixture model to the organization of cell images using an expectation maximization fitting technique.

Another aspect of the invention pertains to computer program products including a machine readable medium on which is stored program instructions for implementing any of the methods described above. Any of the methods of this invention may be represented as program instructions that can be provided on such computer readable media.

These and other features and advantages of the present invention will be described below in more detail with reference to the associated drawings.

DETAILED DESCRIPTION OF THE INVENTION

Overview

Figure 1A:
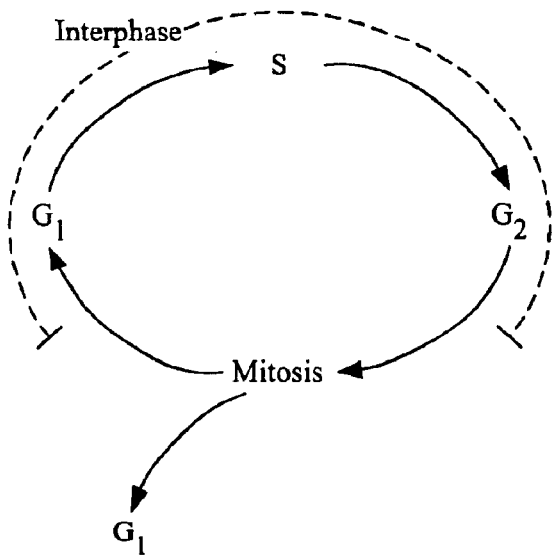
FIG. 1A depicts the sequential phases of the cell cycle.
Figure 1B:
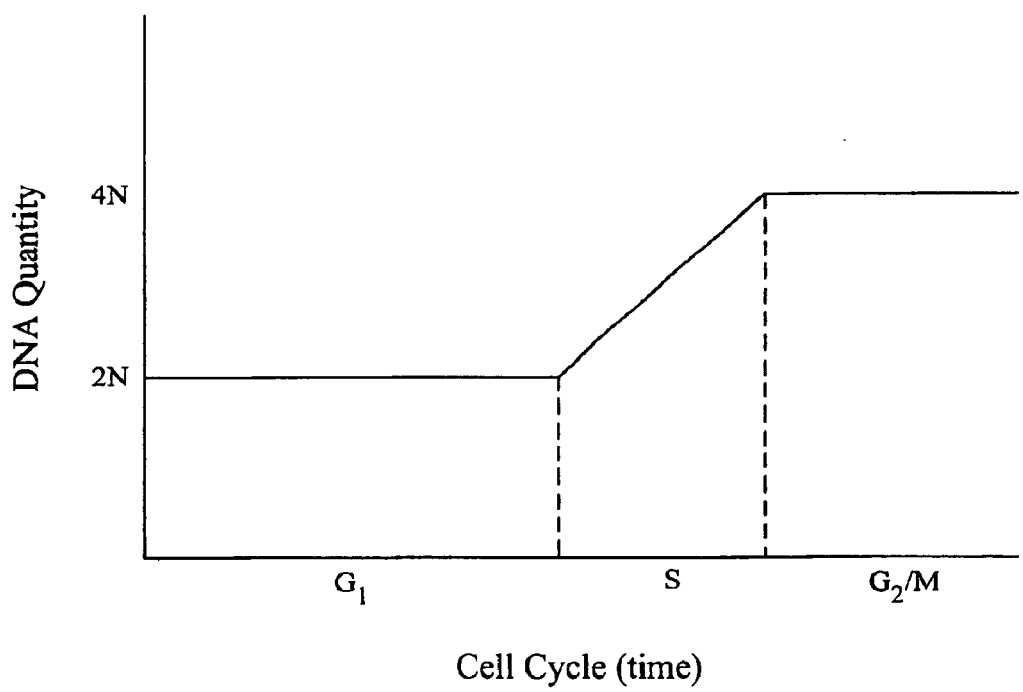
FIG. 1B is a plot showing how the quantity of nuclear DNA varies as a function of cell cycle phase.

Generally, this invention relates to image analysis processes (methods) and apparatus allowing image analysis. It also relates to machine-readable media on which is provided instructions, data structures, etc. for performing the processes of this invention. In accordance with this invention, images of cells are manipulated and analyzed in certain ways to extract relevant features. Using those features, the apparatus and processes of this invention, can automatically draw certain conclusions about the biology of a cell. For example, the invention can identify the amount of DNA in a cell from its image. The invention can also determine which phase of the cell cycle that the cell was in when its mage was taken.

Relevant features from an image include morphological, textual and intensity features. For cell cycle analyses, relevant features often pertain to the amount and/or distribution of DNA in a cell, particularly nuclear DNA. The invention is not limited to these features, as other cellular markers such as cytoskeletal proteins (e.g., tubulin), proteins having levels of expression that change significantly when the cell approaches mitosis (e.g., cyclin B), proteins undergoing additional post-translational modification during mitosis (e.g., histones, which are phosphorylated), certain kinesins, and certain cellular organelles (e.g., centrosomes), for example will also mark changes at certain stages of the cell division cycle. Thus, some embodiments of this invention consider the amount and/or distribution of these other markers. Some embodiments employ a combination of features from multiple markers, including DNA for example.

The invention will now be described in terms of particular specific embodiments as depicted in the drawings. However, as will be apparent to those skilled in the art the present invention may be practiced without the employing some of the specific details disclosed herein. Some operations or features may be dispensed with. And often alternate elements or processes may be substituted.

Figure 2:
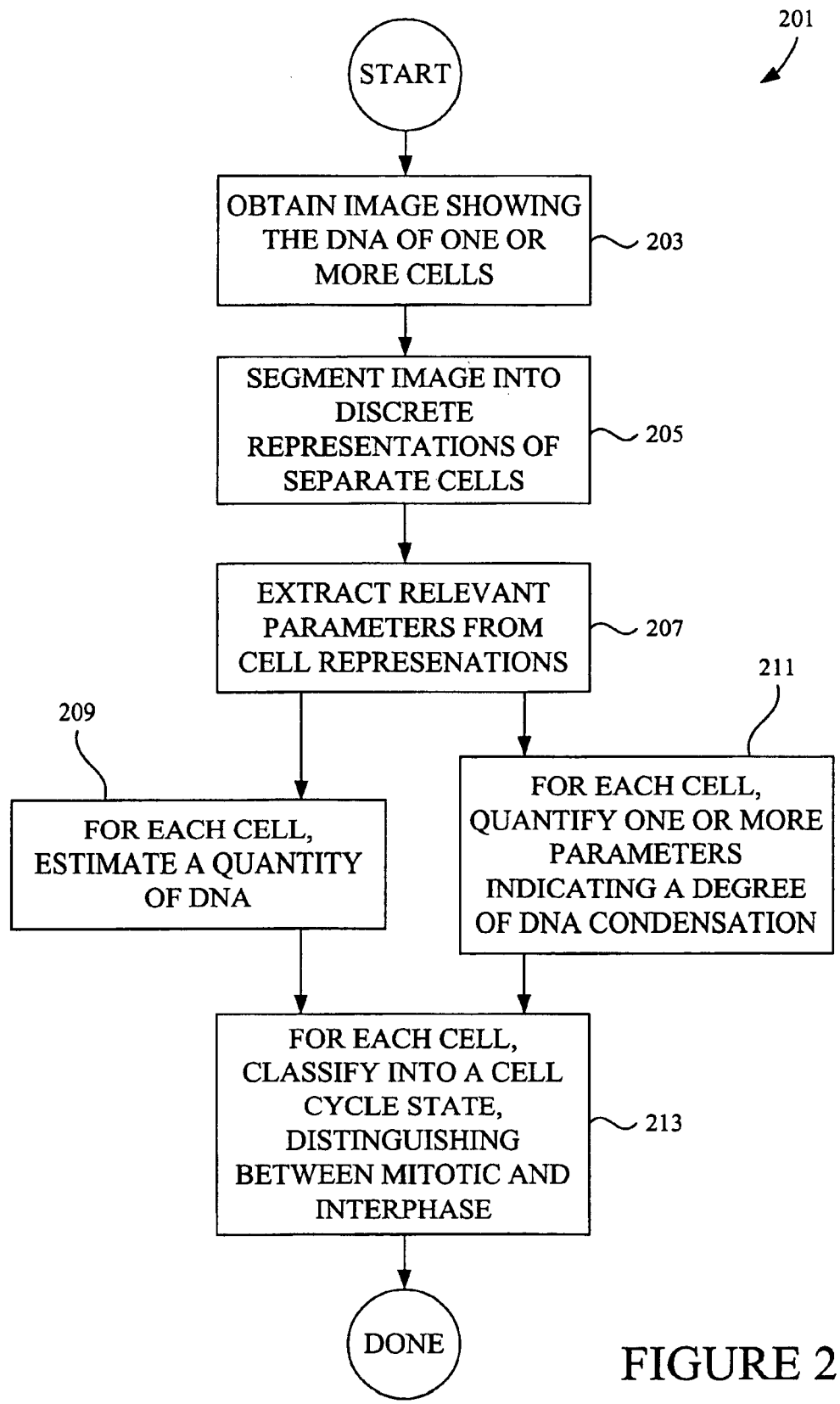
FIG. 2 is a process flow diagram depicting—at a high level—one process of this invention for using an image of a cell to classify the cell according to its cell cycle phase and distinguishing between mitotic and interphase cells.

A high level process flow 201 in accordance with one embodiment of this invention is depicted in FIG. 2. As shown, the process begins at 203 where an image analysis tool (typically logic implemented in hardware and/or software) obtains an image showing the DNA from one or more cells. Typically, an image will be taken from an assay plate or other cell support mechanism in which multiple cells are growing or stored. The image is taken in a manner that allows the DNA within the cells to be identified within the image. Preferably, the amount of DNA as function of position within each cell is easily determined from the image.

The relevant image provided at 203 is captured by an image acquisition system. In one embodiment, the image acquisition system is directly coupled with the image analysis tool of this invention. Alternatively, the image under consideration may be provided by a remote system unaffiliated with the image acquisition system. For example, the images may be acquired by a remote image analysis tool and stored in a database or other repository until they are ready for use by an image analysis tool of this invention.

After the image has been obtained at 203, the image analysis tool segments the image into discrete cell representations at 205. The goal of segmentation is to perform image analysis on a cell-by-cell basis. In a preferred embodiment, each representation includes only those pixels where the DNA of a single cell is deemed to be present. Thus, each representation is a bounded collection of pixels, each having an associated intensity value. Note that the intensity value of each pixel represents the amount of DNA at the corresponding location. The shape of each representation resulting from segmentation represents the boundaries within which the cellular DNA lies. In interphase cells, the DNA is normally contained entirely within the nucleus. In mitotic cells, the DNA does not reside within a nucleus.

Each cell (DNA) representation obtained by segmentation is separately analyzed to extract various relevant parameters. See 207. As mentioned, most of the relevant parameters can be classified as either geometric parameters or statistical parameters. Various examples will be presented and described below. Generally these parameters are chosen to indicate the amount of DNA in a given cell and/or the distribution of that DNA at locations within the cell.

After the relevant parameters have been extracted at 207, certain of these parameters are used to estimate a quantity of DNA and certain other parameters associated with DNA condensation are used to estimate a degree of condensation. See blocks 209 and 211, respectively. Finally, at 213, the image analysis tool uses the estimated values obtained at 209 and 211 to classify the cells into at least one of five classifications. These classifications each represent a unique intersection of interphase states ($G_1$ versus S versus $G_2$) and division states (mitotic versus interphase).

Additional operations may be performed prior to, during, or after the operations described FIG. 2. For example, "quality control algorithms" may be employed to discard image data based on, for example, poor exposure, focus failures, foreign objects, and other imaging failures. Generally, problem images can be identified by abnormal intensities and/or spatial statistics.

In a specific embodiment, a correction algorithm may be applied prior to segmentation to correct for changing light conditions, positions of wells, etc. In one example, a noise reduction technique such as median filtering is employed. Then a correction for spatial differences in intensity may be employed. In one example, the spatial correction comprises a separate model for each image (or group of images). These models may be generated by separately summing or averaging all pixel values in the x-direction for is each value of y and then separately summing or averaging all pixel values in the y direction for each value of x. In this manner, a parabolic set of correction values is generated for the image or images under consideration. Applying the correction values to the image adjusts for optical system non-linearities, mis-positioning of wells during imaging, etc.

The production of the images includes cell plating, drug dilution, drug addition and imaging focusing. Failures in any these systems can be detected by a variety of methods. For example, cell plating could fail because of a clogged tip in a delivery pipette. Such failure can be identified by adding a fluorescent dye or bead to the cell suspension. The fluorescence of this dye or bead is chosen to be at a different channel (wavelength) than DNA the marker for the nuclei. Another potential failure could occur during drug delivery. To detect such failures, one can add a fluorescent dye or bead in the compound plate before drug dilution. The amount of fluorescent dye or bead is proportional to the amount of drug. Yet another potential problem occurs when the focus of the image acquisition system changes during imaging. To account for such spatial biases, one can employ control wells containing, for example, cells with no or neutral compounds interspersed throughout the plate. Still another problem results from foreign objects (e.g., small dust particles) in the well. This can be addressed with image segmentation and statistical outlier identification techniques.

Generally the images used as the starting point for the methods of this invention are obtained from cells that have been specially treated and/or imaged under conditions that contrast the cell's DNA from other cellular components and the background of the image. In the preferred embodiment, the cells are fixed and then treated with a material that binds to DNA and shows up in an image. Preferably, the chosen agent specifically binds to DNA, but not to most other cellular biomolecules. Preferably, the chosen agent binds indiscriminately with DNA, regardless of its location in the cell. In other embodiments, the chosen agent binds to specific sequences of DNA or regions of a chromosome. The agent should provide a strong contrast to other features in a given image. To this end, the agent should be luminescent, radioactive, fluorescent, etc. Various stains and fluorescent compounds may serve this purpose. Examples of such compounds include fluorescent DNA intercalators and fluorescently labeled antibodies to DNA or other nuclear component. Examples of fluorescent DNA intercalators include DAPI and Hoechst 33341 available from Molecular Probes, Inc. of Eugene, Oreg. The antibodies may be fluorescently labeled either directly or indirectly.

Various techniques for preparing and imaging appropriately treated cells are described in U.S. patent application Ser. Nos. 09/310,879, 09/311,996, and 09/311,890, previously incorporated by reference. In the case of cells treated with DAPI or other fluorescent material, a collection of such cells is illuminated with light at an excitation frequency. A detector is tuned to collect light at an emission frequency. The collected light is used to generate the image and highlights regions of high DNA concentration.

Figure 3:
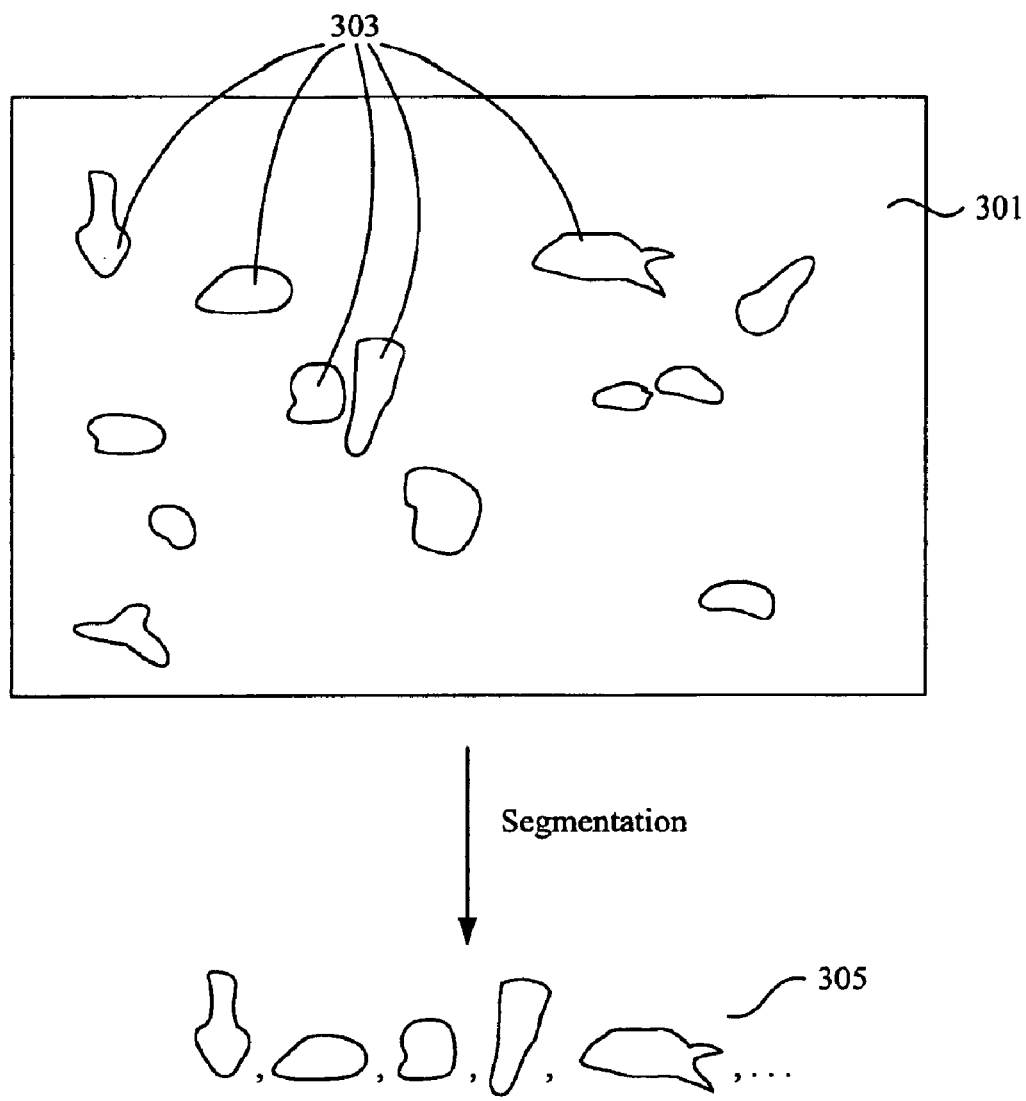
FIG. 3 illustrates how an image of multiple cells may be segmented to provide separate representations of individual cells and thereby allow a cell-by-cell analysis.

One approach to segmentation is depicted in FIG. 3. As shown there, an image 301 includes a plurality of cell images 303, each having the cell DNA highlighted. Segmentation effectively converts image 301 into discrete images/representations for the DNA of each cell as shown at 305. In a preferred embodiment, this collection of representation 305 is provided as a mask providing intensity as a function of position for each cell in image 301.

Individual cell representations 305 may be extracted from image 301 by various image analysis procedures. Preferred approaches include edge finding routines and threshold routines. Some edge finding algorithms identify pixels at locations where intensity is varying rapidly. For many applications of interest here, pixels contained within the edges will have a higher intensity than pixels outside the edges. Threshold algorithms convert all pixels below a particular intensity value to zero intensity in an image subregion (or the entire image, depending upon the specific algorithm). The threshold value is chosen to discriminate between cell (DNA) images and background. All pixels with intensity values above threshold in a given neighborhood are deemed to belong to a particular cell.

The concepts underlying thresholding are well known. The technique is exemplified in FIG. 4, which presents a plot 401 of intensity versus pixel location for an entire image such as image 301. For simplicity, pixels from a single row of an image are considered. A threshold value 403 is chosen to extract those features of the image having intensity values deemed to correspond to actual cells. In this example, peaks 405, 407, and 409 all contain collections of pixels having intensity values above threshold 403. Therefore, each of these is deemed to be a separate "cell" for extraction during segmentation. Because peak 411 lies entirely below threshold 403, it is not identified as a discrete cell.

An appropriate threshold may be calculated by various techniques. In a specific embodiment, the threshold value is chosen as the mode (highest value) of a contrast histogram. In this technique, a contrast is computed for every pixel in the image. The contrast may be the intensity difference between a pixel and its neighbors. Next, for each intensity value (0–255 in an eight byte image), the average contrast is computed. The contrast histogram provides average contrast as a function of intensity. The threshold is chosen as the intensity value having the largest contrast. See "The Image Processing Handbook," Third Edition, John C. Russ 1999 CRC Press LLC IEEE Press, and "A Survey of Thresholding Techniques," P. K Sahoo, S. Soltani and A. K. C. Wong, Computer Vision, Graphics, and Image Processing 41, 233–260 (1988), both of which are incorporated herein by reference for all purposes.

In a specific embodiment, edge detection may involve convolving images with the Laplacian of a Guassian filter. The zero-crossings are detected as edge points. The edge points are linked to form closed contours, thereby segmenting the relevant image objects. See The Image Processing Handbook, referenced above.

At some point, an image analysis process must obtain image parameters relevant to the biological condition under consideration. Typically, the parameters of interest relate to the size, shape, contour, and/or intensity of the cell images. Examples of specific parameters for analyzing the cell cycle stages include the following:

| | |
|---|---|
| Total Intensity | sum of pixel intensities in an object |
| Average Intensity | average intensities in an object |
| Area | number of pixels in an object |
| Axes Ratio | ratio of lengths of axes of a fitted ellipse |
| Eccentricity | distance from the center of an ellipse to its focus |
| Solidity | measure of pixels inside versus pixels outside an object surrounded by a simple shape |
| Extent | the area of the object divided by area of the smallest box to contain the object. |
| Q05 | 5% quantile of total intensity |
| Q25 | 25% quantile of total intensity |
| Q50 | 50% quantile of total intensity |
| Q75 | 75% quantile of total intensity |
| Q95 | 95% quantile of total intensity |

Image analysis routines for extracting these various parameters can be designed using well known principles. See The Image Processing Handbook, referenced above. In addition, various commercially available tools provide suitable extraction routines. Examples of some of these products include the MetaMorph Imaging System, provided by Universal Imaging Corporation, a company with headquarters in West Chester, Pa. and NIH Image, provided by Scion Corporation, a company with headquarters in Frederick, Md.

Image Analysis to Estimate Quantities of DNA

One feature of the present invention is the ability to accurately measure the amount of DNA in a given cell from a particular image of that cell. While the ability to accomplish this has multiple uses, the process depicted in FIG. 2 provides a particularly useful application. See block 209. In general, an agent applied to highlight DNA should emit a signal that is proportional to the amount of agent that has bound to DNA. Thus, the amount of signal (usually indicated by the signal intensity) provides a direct indication of the quantity of DNA present in a given cell. When this is the case, the present invention allows one to obtain an accurate measure of the amount of DNA in a given cell. Each of the above-mentioned stains is suitable for identifying the amount of DNA in a cell.

Figure 5:
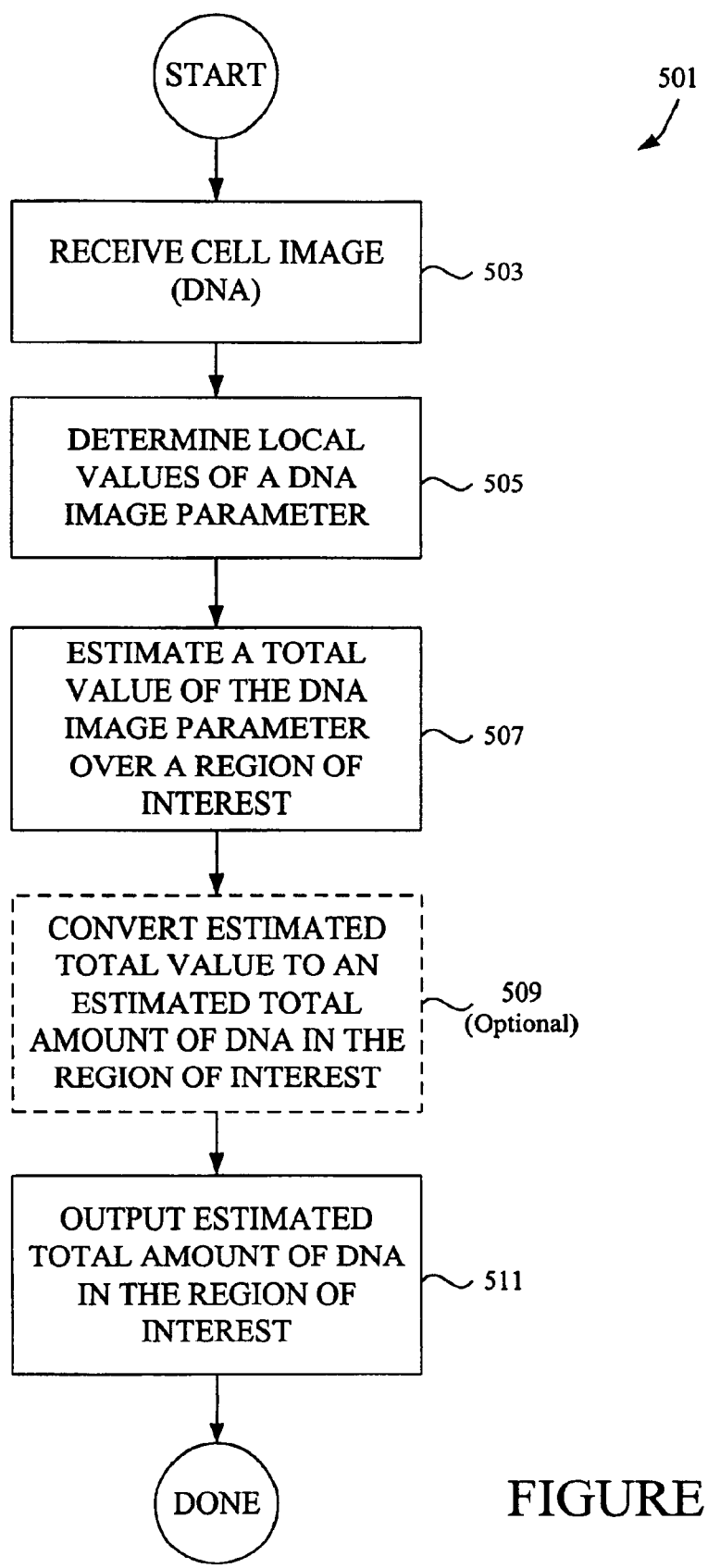
FIG. 5 is a process flow diagram illustrating an image analysis process of this invention that estimates the amount of DNA in a cell using an image of the cell.

Turning now to FIG. 5, a specific process sequence 501 that may be used to measure an amount of DNA in a cell is depicted. In the context of process 201, sequence 501 corresponds to blocks 207 and 209. As shown in FIG. 5, the process begins at 503 when the image analysis process receives a cell image. Often that image will have been derived from a larger, segmented image of multiple cells. As indicated, the image will highlight the regions where DNA is present. To facilitate image analysis, the cell image is typically a digital representation of the cell, or a component of the cell such as its nucleus or other region where DNA is present.

Next, the image analysis process determines local values of a "DNA image parameter." See 505. Commonly the DNA image parameter will be an intensity value of light or radiation shown in the image. Often, the intensity value will be provided on a per pixel basis. In addition, the intensity value may be provided at a particular wavelength or narrow range of wavelengths that correspond to the emission frequency of an agent that specifically associates with cellular DNA.

After the process has determined the local values of the DNA image parameter, it next estimates a total value of the DNA image parameter over a region of interest. See 507. Note that the region of interest may be an entire cell, or some subsection of the cell such as an organelle within the cell (e.g. the nucleus or mitochondria). While the local values of the DNA image parameter may correspond to local concentrations of DNA within the region of interest, the total value of the image parameter corresponds to the total quantity of DNA in the region of interest.

In one embodiment, the process measures the total value of the DNA image parameter by summing a per pixel value of the DNA image parameter over all pixels in the region of interest. Often the per pixel values will require some correction prior to summation. That correction may involve, for example, subtracting a background value and/or correcting for a non-linearity in the image acquisition system/method.

After the process has estimated the total value of the DNA image parameter, it next converts that estimated total value to an estimated total amount of DNA in the region of interest. See 509. Commonly the signal presented in the image (e.g., intensity) at any given location is directly proportional to the amount of DNA at that location in the imaged target cell. In such cases, the conversion of block 509 involves applying a calibration function; in the simple case merely multiplying the total value of the DNA image parameter by a multiplier obtained through calibration. Typically, the multiplier is chosen so that the amount of DNA is provided in a convenient unit such as picograms per cell. Note that because many applications for this aspect of the invention require only a relative estimate of the amount of DNA in a region of interest, the units can be arbitrary. In cases where only a relative estimate of the amount of DNA is required, the process may dispense with operation 509 entirely, and merely use the value obtained at operation 507.

Finally, the analysis process outputs the value of total DNA calculated at 509. See 511. Because this value of DNA quantity may have intrinsic value to a researcher, the output may simply involve displaying or printing out the value so that it can be read and interpreted by a researcher. Alternatively, the value may be passed to a higher-level image analysis process such as process 201 depicted in FIG. 2. If this is the case, the value may be used by another module or algorithmic operation such as that depicted in block 213 of process 201.

As mentioned, one convenient technique for determining the total amount of DNA in a given cell involves summing the intensifies of all pixels provided in a given cell image. The summation is commonly referred to as the "total intensity" associated with the image. Other techniques may be employed to assess the amount of DNA in a given cell based on an analysis of that cell's image. For example, it may be useful to calculate an average intensity of the pixels in a cell and then scale that value for the area of the cell image. Other techniques for determining the amount of DNA from an analysis of a cell image will be readily apparent to those you have skill in the art.

Because any given image acquisition system will exhibit at least some variability and some non-linearity, it will often be necessary to "correct" the intensity values provided in an image. The correction function should generally be a monotonically non-decreasing function of pixel intensity. Typically, it will be necessary to subtract a background value from each pixel in a cell image. In this case, the total intensity may be given by the following expression:

$$\text{TOTAL INTENSITY} = \sum_{i=1}^{\#\,pixels} (I_i - B)$$

Figure 4:
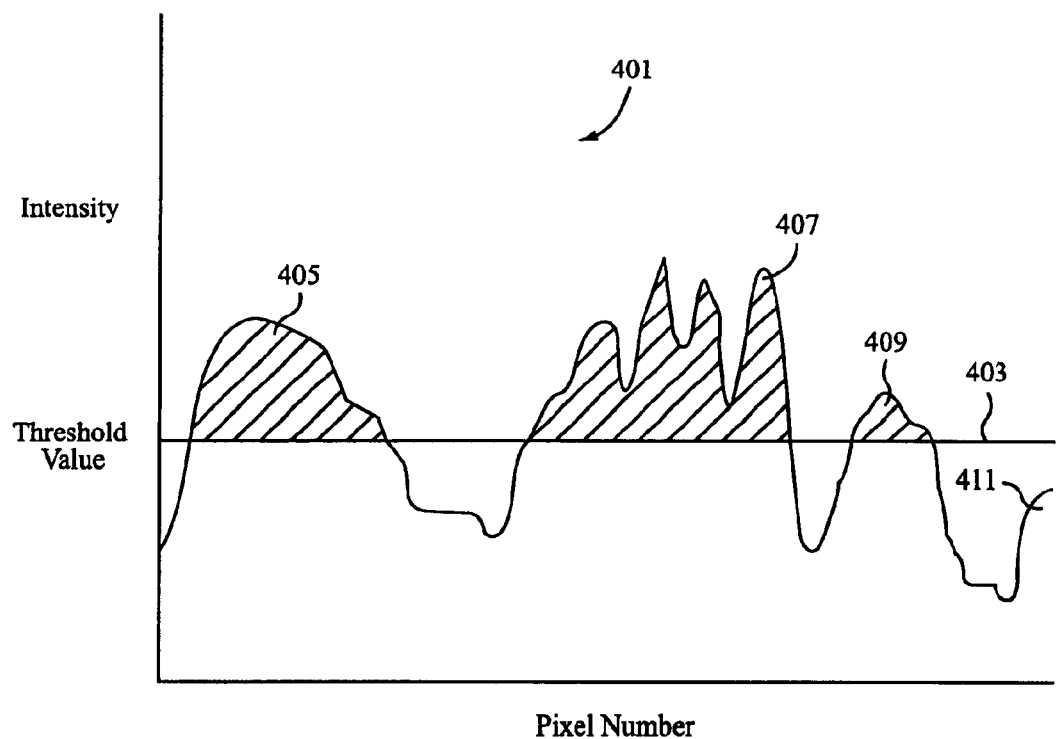
FIG. 4 a plot of intensity versus pixel location in an image and showing how thresholding may be used to segment an image into individual cells.

In this expression, the variable $I_i$ represents the total intensity of any given pixel in the image (or a monotonically non-decreasing function of pixel intensity). The constant B represents the calculated background that must be subtracted from all pixel intensity values. Note that the value of B is calculated for an entire image, which often includes many different cells. After such image is segmented as described above, each resulting cell image from the parent image is analyzed using the same value of B. Another way to view the total intensity of a given cellular image involves calculating the area under a plot of intensity versus pixel number for a given cellular image. For example, if the level 403 shown in FIG. 4 represents a background level (B) as opposed to a thresh hold value, then shaded areas under peeks 405, 407, and 409 represent the total intensity (and hence the amount of DNA) in each of the cells associated with those peaks.

Figure 6:
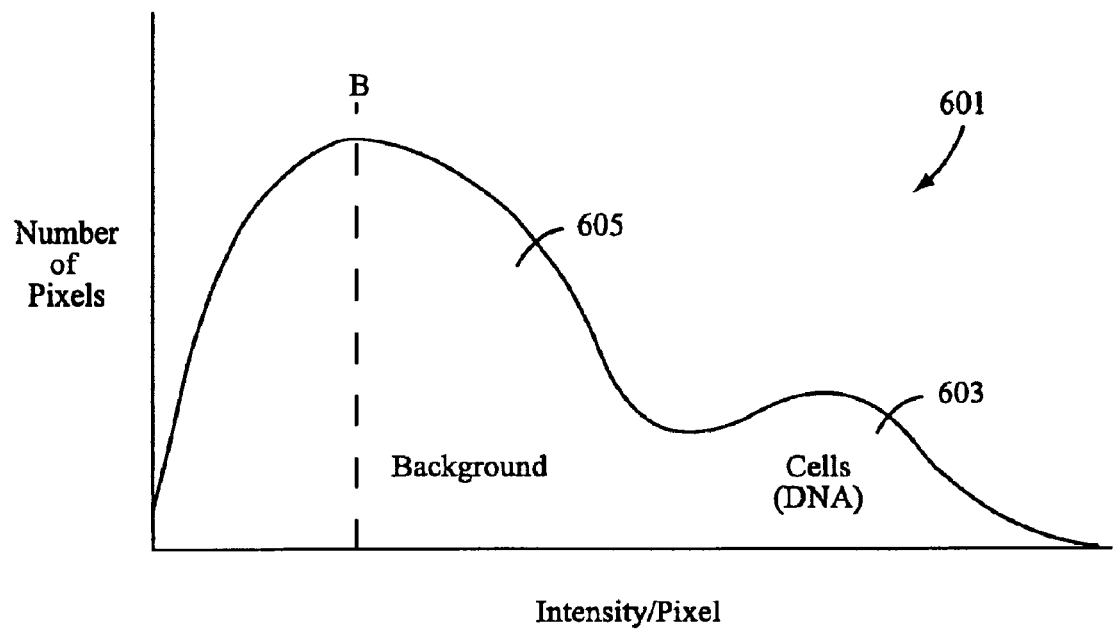
FIG. 6 is a histogram of an image used to illustrate how the "background" of an image may be identified for the purpose of background subtraction.

In one approach, a background level for a given image can be identified by analyzing a histogram 610 as depicted in FIG. 6. As shown there, the number of pixels having a particular intensity is plotted versus intensity per pixel. A typical histogram will include two or more peaks. Usually, there will be a lower intensity and relatively large background peak. Smaller, higher intensity, peaks will also be discernable. In the example depicted in FIG. 6, histogram 601 includes a large, low intensity, peak 605 associated with the background of the image and a smaller, high intensity, peak 603 associated with the cells (DNA) of the image. The background level, B, subtracted from the per-pixel intensity values may be selected to be the intensity at the peak of curve 605. Other procedures for determining the value of B from a histogram such as histogram 601 will be readily apparent to those who have skill in the art.

Regarding other "corrections" used in measuring intensity, the absolute magnitude of intensity can vary from image to image due to non-linearities in the image acquisition procedure and/or apparatus. Specific optical aberrations can be introduced by various image collection components such as lenses, filters, beam splitters, polarizers, etc. Other non-linearities may be introduced by an excitation light source, a broad band light source for optical microscopy, a detector's detection characteristics, etc. For example, some optical elements do not provide a "flat field." As a result, pixels near the center of the image have their intensities exaggerated in comparison to pixels at the edges of the image. A correction algorithm may be applied to compensate for this effect. Such algorithms can be easily developed for particular optical systems and parameter sets employed using those imaging systems. One simply needs to know the response of the systems under a given set of acquisition parameters.

Distinguishing Mitotic and Interphase Cells

As indicated, it is often important to distinguish between mitotic and interphase cells. Depending upon how far a particular cell has progressed into mitosis, an image of the cell may possess a single region of DNA or two separated regions of DNA. If it possesses a single region, that region should have a quantity of DNA associated with the $G_2$ phase. If it possesses two separate regions, each of those regions should have a quantity of DNA corresponding to the $G_1$ phase. Sometimes a segmentation operation will produce two separate "objects" for a late phase mitotic cell: one image for each of the two separated DNA regions. Thus, a simple estimation of the amount of DNA in an image segment may not be able to distinguish between late phase mitotic cells (in which separate regions of DNA are sometimes improperly identified as separate cell) and $G_1$ interphase cells. Similarly, such estimation may not alone distinguish between early stage mitotic cells and interphase $G_2$ cells. In process 201, these distinctions are accomplished at 211 by quantifying one or more parameters indicating a degree to which the DNA in the cell has condensed and/or separated.

Figure 7:
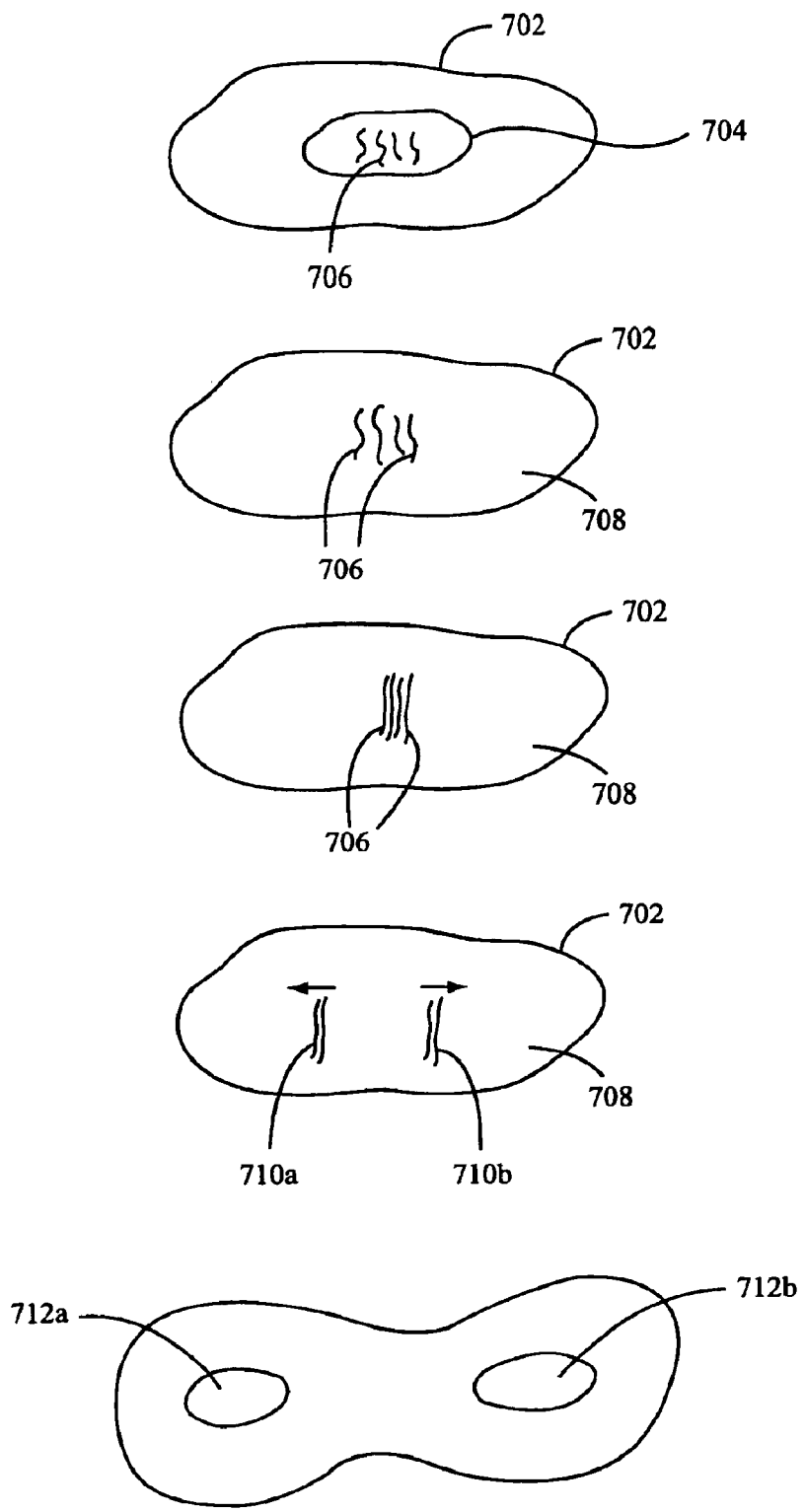
FIG. 7 is a cartoon diagram depicting the various mitotic phases of a typical eucaryotic cell.

The significance of DNA condensation and separation can be better understood with reference to FIG. 7, which illustrates in cartoon fashion five separate phases of mitosis. As a cell: enters mitosis, its DNA begins to condense within the nucleus so that one can see individual chromosomes. This phase is referred to as the prophase of mitosis and is schematically illustrated by cell 707 including a nucleus 704 in which individual chromosomes 706 have become visible. At the end of prophase, the cell's nuclear envelope begins to breakdown so that the individual chromosomes now reside within the cell's cytoplasm. At this point, the mitotic cell has entered the prometaphase in which the chromosomes 706 of cell 702 have moved into the cell's cytoplasm 708. Note that the chromosomes are still localized near the center of cell 702.

Next, the chromosomes within the cytoplasm tightly align themselves with one another as shown in the third illustration of the cartoon sequence. This is the mitotic cell's metaphase. In the next stage in the progression (represented in the fourth image of the sequence), the chromosomes separate into two groups 710A and 710B while moving away from each other within the cell's cytoplasm 708. This is the mitotic cell's anaphase.

Finally, the separated groups of chromosomes partition themselves into two new nuclei 712A and 712B and the cytoplasm begins to pinch of in the middle to form two daughter cells. Within new nuclei 712A and 712B the chromosomes begin to de-condense into more evenly distributed nucleic acid. This final stage of the mitotic cell is the telophase. The daughter cells generated from the telophase mitotic cell each temporarily reside in the $G_1$ phase. Then they typically progress through the S and $G_2$ phases before entering the next mitotic phase.

One aspect of the present invention provides an image analysis process that can distinguish between interphase and mitotic cells. In a particularly preferred embodiment, the process distinguishes between interphase and mitotic cells by considering parameters that indicate the degree to which nuclear DNA has condensed to chromosomes. Examples of such parameters include parameters that relate to the average intensity of DNA within a cell, the variance in the intensity of DNA within a cell, the size of a region where the DNA resides within a cell, and/or a maximal concentration of DNA within a cell (often indicated by a maximal signal intensity detected in an image of the cell).

Figure 8:
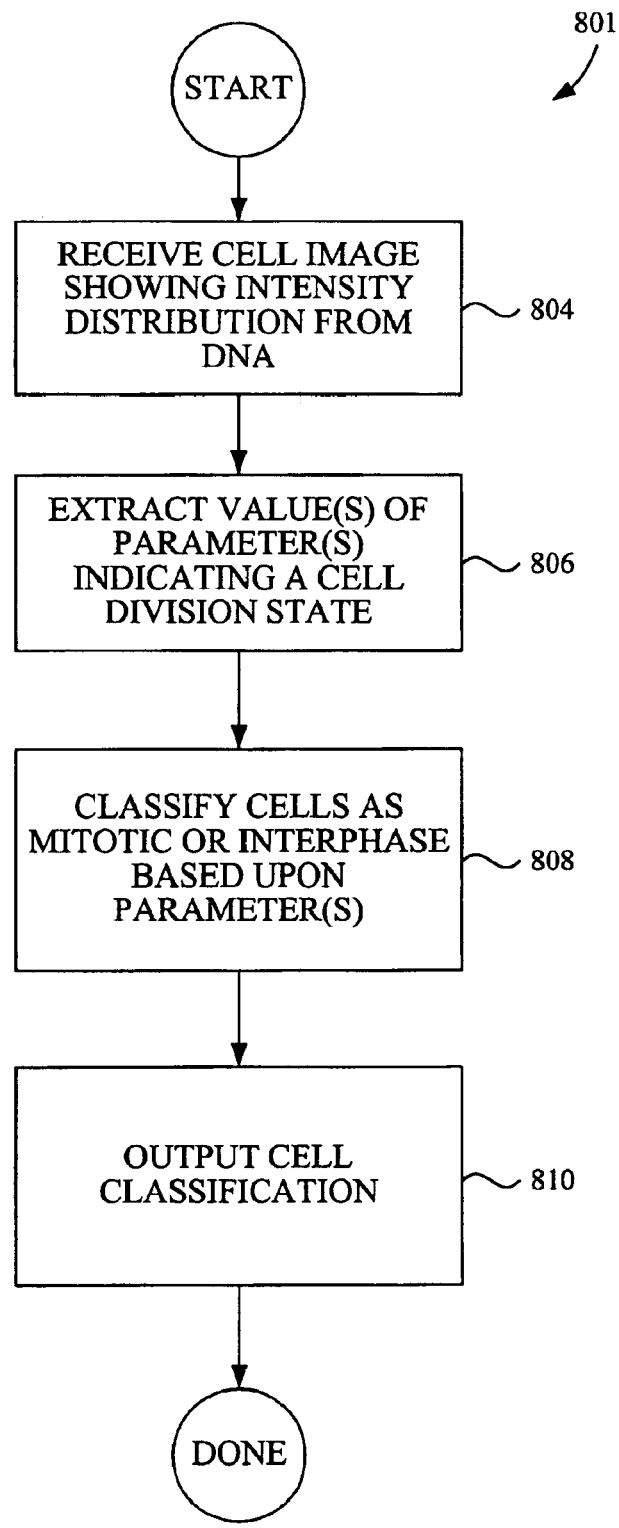
FIG. 8 is a process flow diagram illustrating an image analysis process of this invention that classifies cells as either mitotic or interphase cells.

One process, 801, for classifying cells as either mitotic or interphase is depicted in FIG. 8. As shown there, the image analysis process begins at 804 upon receipt of a cell image showing locations of DNA, and possibly the intensity (concentration) associated with that DNA. Such images may be obtained via the segmentation processes described above, for example.

Next, the process extracts values of one or more parameters selected to indicate a cell division state (e.g., either mitotic or interphase). See 806. Thus, the parameter should have a connection to the physical location and/or concentration of DNA within a cell as a signature of a particular cell division state.

As indicated in the discussion of FIG. 7, mitotic cells generally have DNA that has condensed into chromosomes. As a consequence, the size of the region occupied by cellular DNA may decrease. Further, the solidity of the region occupied by the DNA may decrease due to the irregular shape of the chromosomes. Still further, the maximum intensity (corresponding to maximum DNA concentration) may increase in cells due to concentration of DNA into discrete chromosomes. Finally, such cells may exhibit a relatively wide distribution in the intensity of DNA, due to the localization of DNA into the discrete chromosomes. Thus, examples of parameters useful to distinguish mitotic from interphase cells include size parameters (e.g., area, perimeter, diameter, length, etc.), parameters indicating a contour (e.g., solidity), the average or maximum local intensity, and statistical parameters indicating a statistical distribution in local intensity values (e.g., the total mean, kurtosis, variance or standard deviation in intensity).

The particular parameter or group of parameters used for this purpose should be chosen to work at a given set of image acquisition conditions. For example, the size and intensity (variance, average, or maximum) parameters work well at magnifications of about 5x for example. At higher magnifications, solidity can serve as a useful parameter for distinguishing between mitotic and interphase cells (by discriminating between condensed and uncondensed chromosomes).

In one approach to discriminating between mitotic and interphase cells, the invention employs a mitotic discriminator that accounts for two or more relevant parameters. One specific approach includes both the average intensity and the area associated with the DNA. For example, the mitotic discriminator may be a direct function of average intensity and an inverse function of area (e.g., log(average intensity) minus log(area)). Cells with relatively high values of this discriminator would be deemed mitotic and those with relatively low values of the discriminator would be deemed interphase.

As mentioned, variance may also be a useful mitotic discriminator. The variance in DNA intensity may be calculated using the basic statistical expression for variance:

$$\sum_{i=1}^{n} (I_i - \bar{I})^2 / n - 1$$

Figure 9:
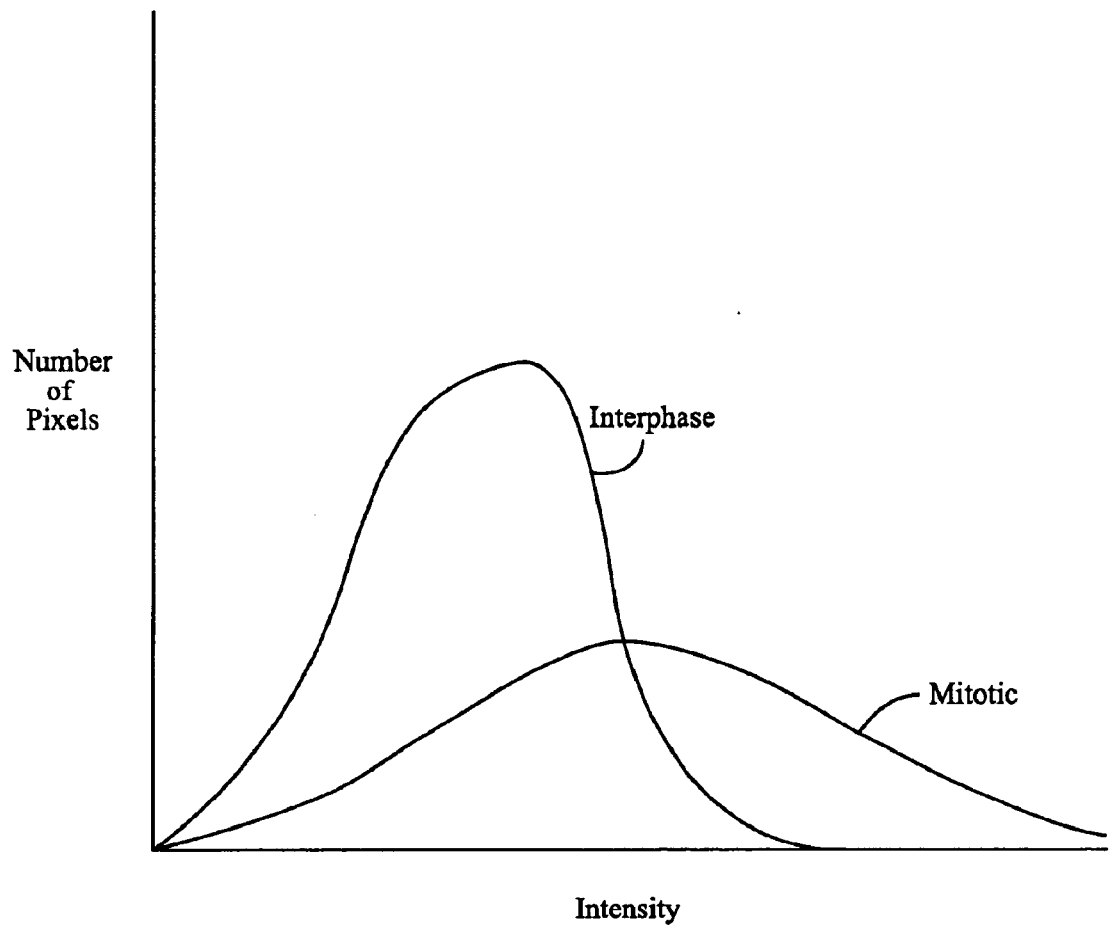
FIG. 9 is a diagram showing the intensity distribution of pixels in a mitotic cell and in an interphase cell.

For a sample defined by the collection of pixels in a cell image, n is the number of pixels in the image, $I_i$ is the intensity of pixel i, and I bar is the mean of the sample. FIG. 9 presents simple histograms for two hypothetical cells, one mitotic and the other interphase. As shown, the mitotic cell has a significantly wider distribution of intensities and hence a larger variance. The concept of variance and mitosis can be further understood by referring to FIG. 4. As shown there, the pixels in a cell image associated with region 407 have a relatively wide variation in intensity (note the rough profile of its peaks) and the pixels in an image associated with region 405 have a relatively small variance. The individual peaks within region 407 are intended to correspond to individual chromosomes. Thus, a process of this invention will more likely classify the cell associated with region 407 as mitotic and the cell associated with region 405 as interphase.

Returning to FIG. 8, after the relevant parameter values have been extracted at 806, the image analysis process (running on an image analysis tool) next classifies the cell under consideration as either mitotic or interphase based upon the parameter values. See 808. Generally the cell may be classified by considering the relative magnitude of the appropriate values extracted at 806. The magnitude of intensity variance is a simple example of this. Note however that particular parameter values may not universally associate with a particular cell division state. For example, different image acquisition techniques may introduce variability in the parameter values for similarly classified cells. Further, different cell types may have different parameter signatures for the same cell division state. And even further, cells of the same type in the same cell division state may exhibit different parameter values depending upon how they were grown and treated.

Thus, it will often be desirable to generate a model from a population of similarly situated cells. Similarly situated cells generally, though not necessarily, are of the same cell type (e.g., the same genotype). They may also have been exposed to the same environmental influences (e.g., growth media, exposure to treatment agents, physical handling, etc.). When such population of similarly situated cells is organized according to the values of the one or more parameters of interest, the image analysis process can determine how the cells distribute themselves. Depending upon the parameter under consideration, the cells should distribute themselves into at least two distinct groups: mitotic and interphase. The process may employ a classification technique to divide the cells of the population into a Class A (mitotic) and a Class B (interphase). Various classification techniques are available for this purpose. These techniques will be discussed in more detail below. One example of such technique employs a mixture model.

The classification operation 808 can also consider the amount of DNA in a particular image segment. Using this information together with the extracted parameter values obtained at 806, a model can further classify a mitotic cell into either a pre-anaphase or a post-anaphase state. This process will be described in more detail below.

Returning again to FIG. 8, image analysis process 801 concludes at 810 with the process outputting the cell classification generated at 808. As with process 501, this output can represent the end of a complete analysis or the passage of control to another operation in a more involved image analysis algorithm. In the context of FIG. 2, for example, the output provided at 810 may pass to process 201 for use in operation 213. Note further that operations 808 and 810 of process 801 may be performed within operation 211. Still further, operations 804 and 806 of process 801 may be performed within operation 207 of higher level process 201.

Image Analysis for High Resolution Phase Classification

Figure 10:
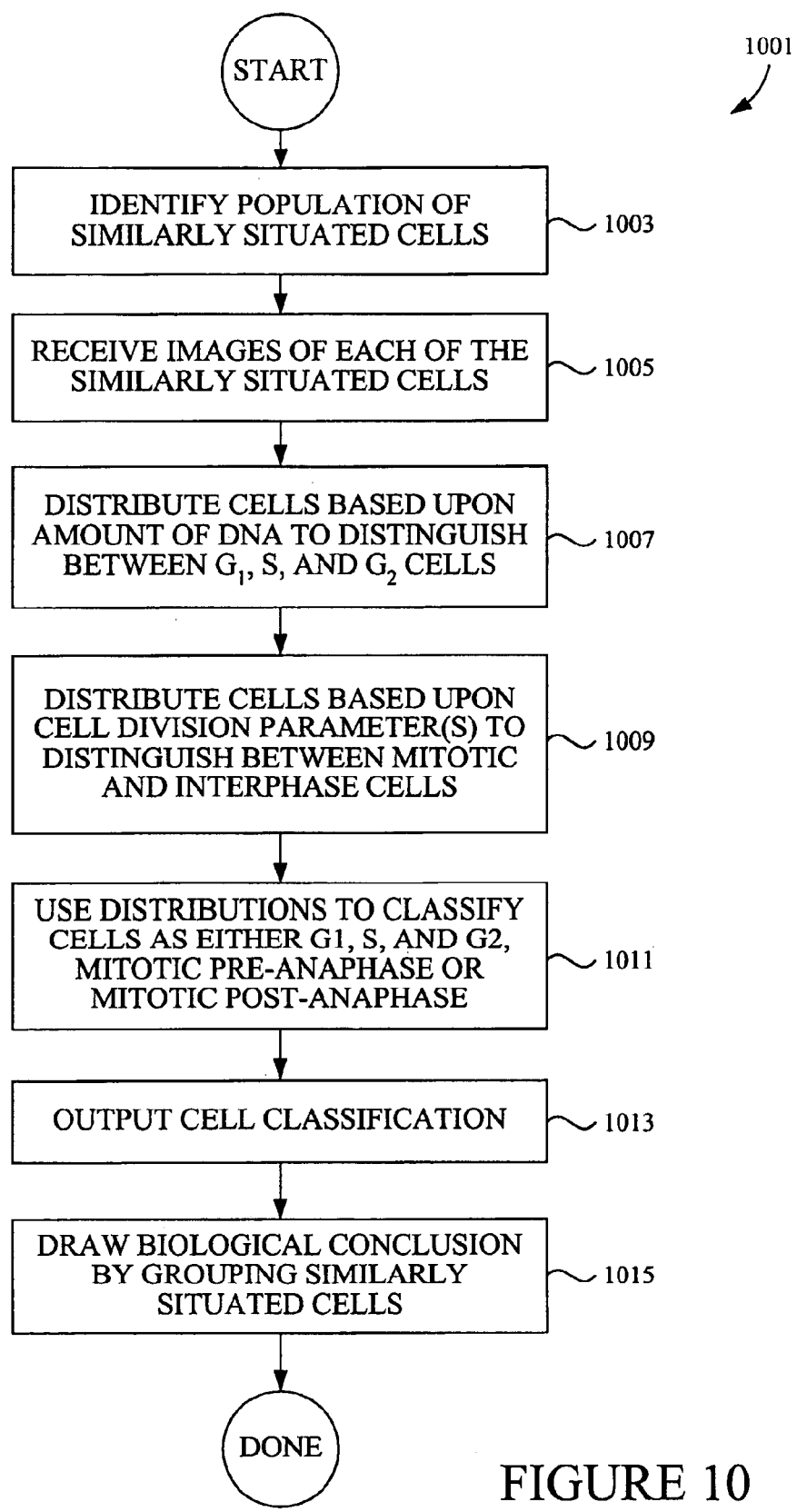
FIG. 10 is process flow diagram illustrating an image analysis process of this invention that classifies cells as one of $G_1$, S, $G_2$, pre-anaphase mitotic, or post-anaphase mitotic.

As mentioned, one aspect of this invention has as its goal classifying cells into one of the following five states: G1, S, G2, pre-anaphase mitotic, and post-anaphase mitotic. One implementation of this aspect of the invention is depicted in FIG. 10. As shown there, an image analysis process 1001 performs the desired classification.

The process begins at 1003 with the process identifying a population of similarly situated cells. As discussed above, these are cells that are similar in terms of their cell type and or their exposure to environmental influences. As such, the population of these similarly situated cells should distribute itself into various phases of the cell growth and cell division cycle. In one example, the cells of interest are liver cells from a single organism that have been exposed to a particular drug under consideration. Further, each of these cells has been imaged by the same imaging system. After the relevant population of cells has been identified at 1003, the process next receives images of the individual cells in the population. See 1005. These images may be provided as the output of a segmentation process as illustrated at block 205, for example.

With the cell images now available for analysis, the image analysis process categorizes the cells based upon the amount of DNA that each contains. This allows the process to distinguish between those cells in the interphase states $G_1$, S, and $G_2$, and between the mitotic states pre-anaphase and post-anaphase. See 1007. The amount of DNA in each cell may be estimated using the technique described in FIG. 5, for example. Note that operation 1007 does not necessarily allow distinction between pre-anaphase and $G_2$ or between post-anaphase and $G_1$.

Preferably, the classification performed at 1007 involves a model that evaluates the relative positions of all cells of the population as a function of their DNA content. Assuming that the population of cells behaves roughly as excepted, a distribution of cells according to their amount of DNA should show two large groupings: one associated with G1, post-anaphase, and the other associated with G2, pre-anaphase. The cells between these two groupings will be in the S phase.

Figure 11A:
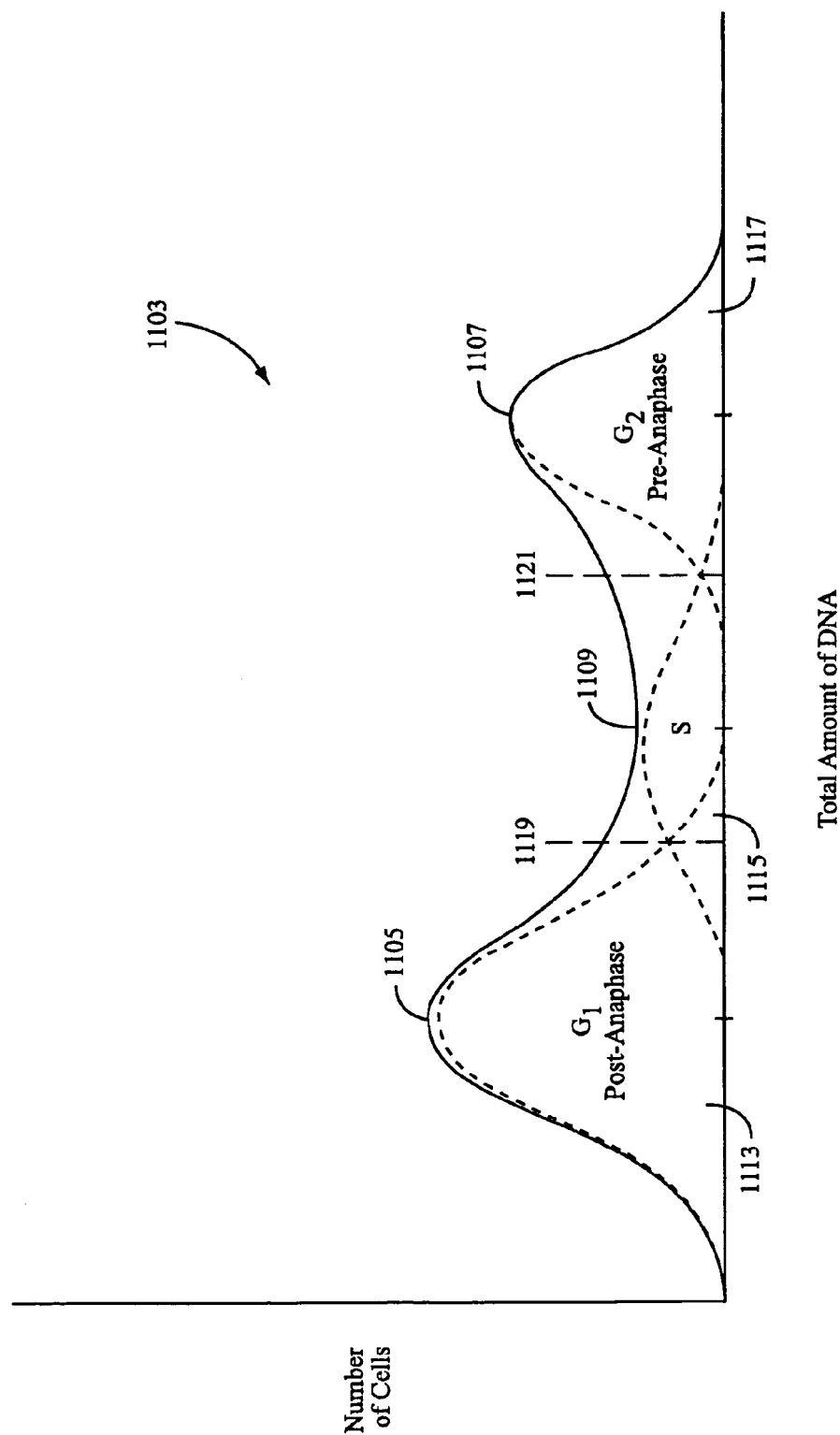
FIG. 11A is a distribution of a population of cells divided into three groups based on amount of nuclear DNA: (a) $G_1$ and post-anaphase, (b) S, and (c) $G_2$ and pre-anaphase.

FIG. 11A shows a histogram 1103 (solid line) of the number of cells in the population versus the amount of DNA in each cell (represented as total DNA intensity). As shown, the histogram 1103 includes a first peak 1105 having a relatively low amount of DNA and a second peak 1107 having a relatively high amount of DNA. The cells that comprise peak 1105 are either in the G1 or post-anaphase state. The cells in the second peak, 1107, are in either the G2 or pre-anaphase state. Cells between these two peaks are in the S phase as indicated at saddle 1109.

Using distributions such as that shown in FIGS. 11, image analysis process 1001 (FIG. 10) can classify cells based on the amount of DNA using conventional techniques. In one embodiment, operation 1007 involves the use of a mixture model which technique is described in more detail below.

After the process 1001 has performed operation 1007, it next categorizes the cells of the population based upon certain cell division parameters in order to distinguish between mitotic and interphase cells. Again, this process may involve use of a mixture model. Further, appropriate examples of process details have been set forth in the description of FIG. 8.

At this point in the process, the cells have been classified into growth states based upon the amount of DNA and have been classified into cell division states based upon a mitotic indicator parameter or parameters. Using this information, image analysis process 1001 next classifies the cells as either interphase $G_1$, interphase S, interphase $G_2$, mitotic pre-anaphase, or mitotic post-anaphase. See 1011.

Figure 12:
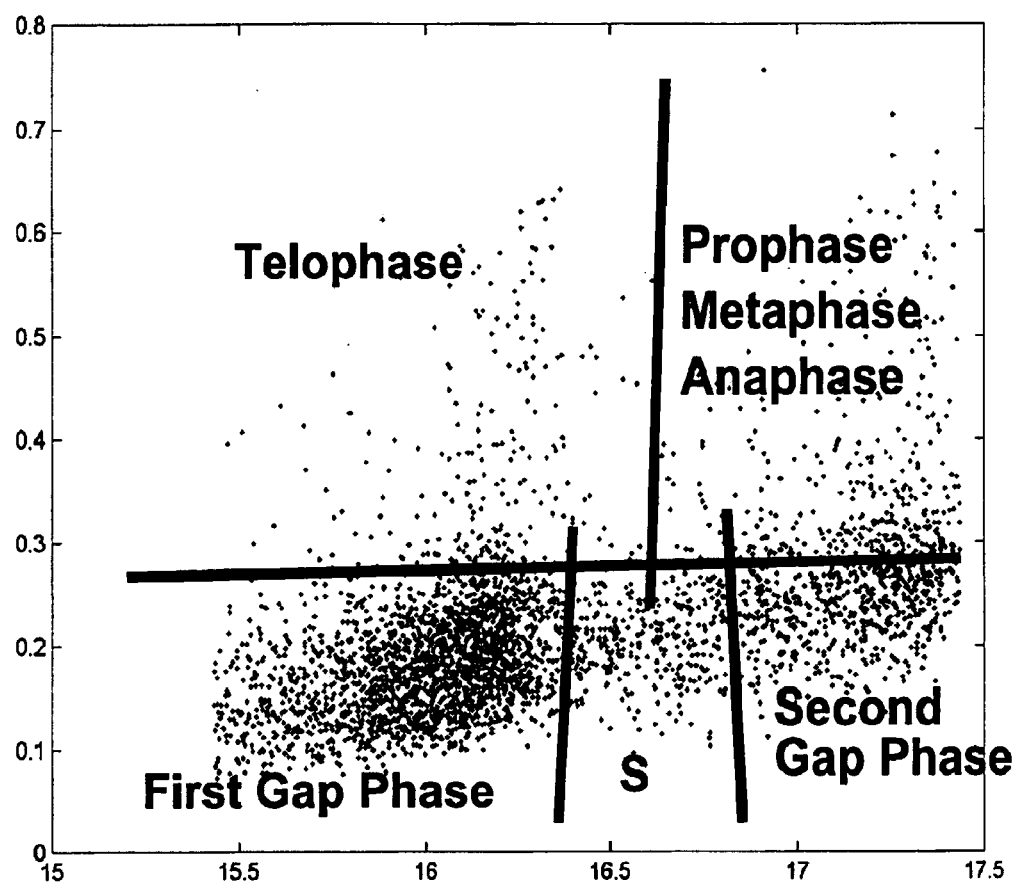
FIG. 12 is a distribution of a population of cells divided into five groups based upon amount of DNA and intensity variance: (a) $G_1$, (b) S, (c) $G_2$, (d) post-anaphase, and (e) pre-anaphase.

FIG. 12 shows a typical distribution of a cell population based on (a) the amount of DNA and (b) the size and intensity of nuclei in the cells. As shown, the cells can be classified into five separate groups based upon their positions in this two-dimensional representation. Cells with relatively low amounts of DNA and little variance in the intensity of their DNA label (and/or small nuclei) are classified as $G_1$ phase cells. Cells having a similar degree of variance in their DNA label intensity but slightly more total DNA are classified as S phase cells. Cells with even more total DNA and comparable degrees of variance in the DNA label intensity are classified as $G_2$ phase cells. Cells having relatively high degrees of variance in the intensity of their DNA label (and/or small nuclei) are classified as either telophase or pre-anaphase (including anaphase) based upon how much DNA they contain. Note that, as is typical, most cells cluster into the $G_1$ phase and the $G_2$ phase. Note that the mitotic cells are grouped into two categories, while the interphase cells are grouped into three categories. The choice of a dividing line between pre and post-anaphase mitotic cells can be drawn in various ways. In one approach, the mitotic cells having intermediate amounts of DNA (e.g., S phase quantities of DNA) are grouped with the pre-anaphase mitotics.

After the cells from the population are appropriately classified at 1011, the process outputs this classification, or a relevant component thereof, at 1013. The classification is output in any convenient format and may be provided to a researcher or another module in a higher level image analysis algorithm. In a preferred embodiment, the entire population of cells or some subset of those cells is used in a higher level clustering or classification analysis. See 1015. For example, the cell state classifications may be employed to cluster a particular gene or agent (e.g., a potential therapeutic) based on mechanism of action, toxicity, etc.

Note that in the above example, the high resolution classification into one of five phases involved a separate classifications based upon amount of DNA and one or more other parameters indicative of nuclear DNA condensation. Other techniques employing other parameters for classification may be employed. For example, mitotic cells may be classified as early stage or late stage based upon the local distribution of DNA. If a mitotic cell's nuclear DNA has separated into two distinct regions, then the cell can be classified as late stage mitotic. If the cell's nuclear DNA has not separated into two distinct regions, then it can be classified as early stage mitotic. To this end, an image analysis process of this invention will extract parameters indicating the relative position of two distinct regions of DNA. If two regions, each having a G1 quantity of DNA are observed within a defined distance, this may identify a late phase mitotic cell. If a single region having a G2 quantity of DNA is observed, then this may suggest an early phase mitotic cell. By considering other parameters in addition to the relative closeness of similar regions of DNA, one can obtain even greater resolution in a classification analysis. For example, the process may be able to distinguish among three or more of the mitotic phases.

Classification Using Population Statistics

In many cases, as mentioned, a given cell image can be meaningfully classified only when a population of similarly situated cells is considered. The members of such population should distribute themselves in a way that conforms with a particular distribution model. For example, at any given instant in time most interphase cells are expected to exist in the $G_1$ and $G_2$ phases, because these phases last longer than the S phase.

When an image analysis process has properly extracted parameter values from a population of cell images, it may employ any of various techniques to estimate the boundaries in parameter space between various classes of cells. One example of such technique includes the mixture model. This technique considers an expected distribution based upon physical model together with the actual distribution of the population. It then computes the estimated boundaries of parameter space.

In a preferred embodiment of this invention, a population of cells is classified according to the quantity of DNA by applying a mixture model to various images. This may be applied at 1007 in FIG. 10, for example. The mixture model assumes that a given distribution of data points is a mixture of two or more component populations, each of which is represented as a normal (Gaussian) distribution. A fitting technique such as an expectation maximization algorithm is employed to estimate the parameters of the component populations. The expectation maximization algorithm is a statistical algorithm that maximizes the mixture likelihood using an iterative optimization routine. It is a well-known algorithm that is described in Dempster, A. P., Laird, N. M., and Rubin D. B., "Maximum Likelihood from Incomplete Data via the EM Algorithm," Journal of the Royal Statistical Society B, 1977 [39]: 1–38, for example. See also Coleman, D. A., Dong X., Hardin, J., Rocke D. M., and Woodruff D. L., "Some Computational Issues of Cluster Analysis," Journal of Computational Statistics and Data Analysis, 1999 July; 31[1]: 1–12. Both of these references are incorporated herein by reference for all purposes. Note that maximization of the mixture likelihood is but one of many non-hierarchical methods for clustering or partitioning data. Other methods such as K-means may work equally well in some cases.

Inputs to the expectation maximization algorithm are the data points (e.g., total intensity of labeled DNA versus number of cells), number of component populations (e.g., three components: $G_1$, S, and $G_2$), and optionally constraints on the mean positions of each component (e.g., 2N for $G_1$, 3N for S, and 4N for $G_2$). The outputs of the model define the Gaussian distribution of each component member of the population. The input data may be pretreated by removing outliers for example cells having much lower DNA content than 2N or much higher DNA content than 4N.

The distributions of the component populations may be defined in terms of their means and standard deviations for example. From this information, appropriate cutoff positions can be defined for the overall distribution. For example a first cutoff may indicate the position at which it is 50% likely that the cell is in the $G_1$ (or post anaphase mitotic) phase and 50% likely that the cell is in the S phase.

Considering FIG. 11A again, the distribution 1103 (solid line) actually comprises three component populations (normal distributions) indicted by dashed curves: $G_1$/post-anaphase M component 1113, S component 1115, and $G_2$/pre-anaphase M component 1117. Using this assumption, expectation maximization technique estimates the mean and standard deviation or variance for each of the three component populations. The point at which a given cell is equally likely to be in the S phase or the $G_1$/post-anaphase M phase(s) is given by 1119. Similarly, the point at which a given cell is equally likely to be in the S phase or the $G_2$/pre-anaphase M phase(s) is given by 1121. These points are easily identified as the points where the Gaussians for adjacent populations intersect.

Typically, the DNA content of the $G_1$ phase component is centered at 2N, the DNA content of the S phase component is centered at 3N, and the DNA content of the $G_2$ phase component is centered at 4N. In a preferred embodiment, the DNA content is represented as the base 2 logarithm of total intensity. This function has exhibits a good separation into three normal distributions. Using this discriminator function, the first peak and second peaks are centered one-half unit apart. The third peak is centered another one-half unit to the right.

Figure 11B:
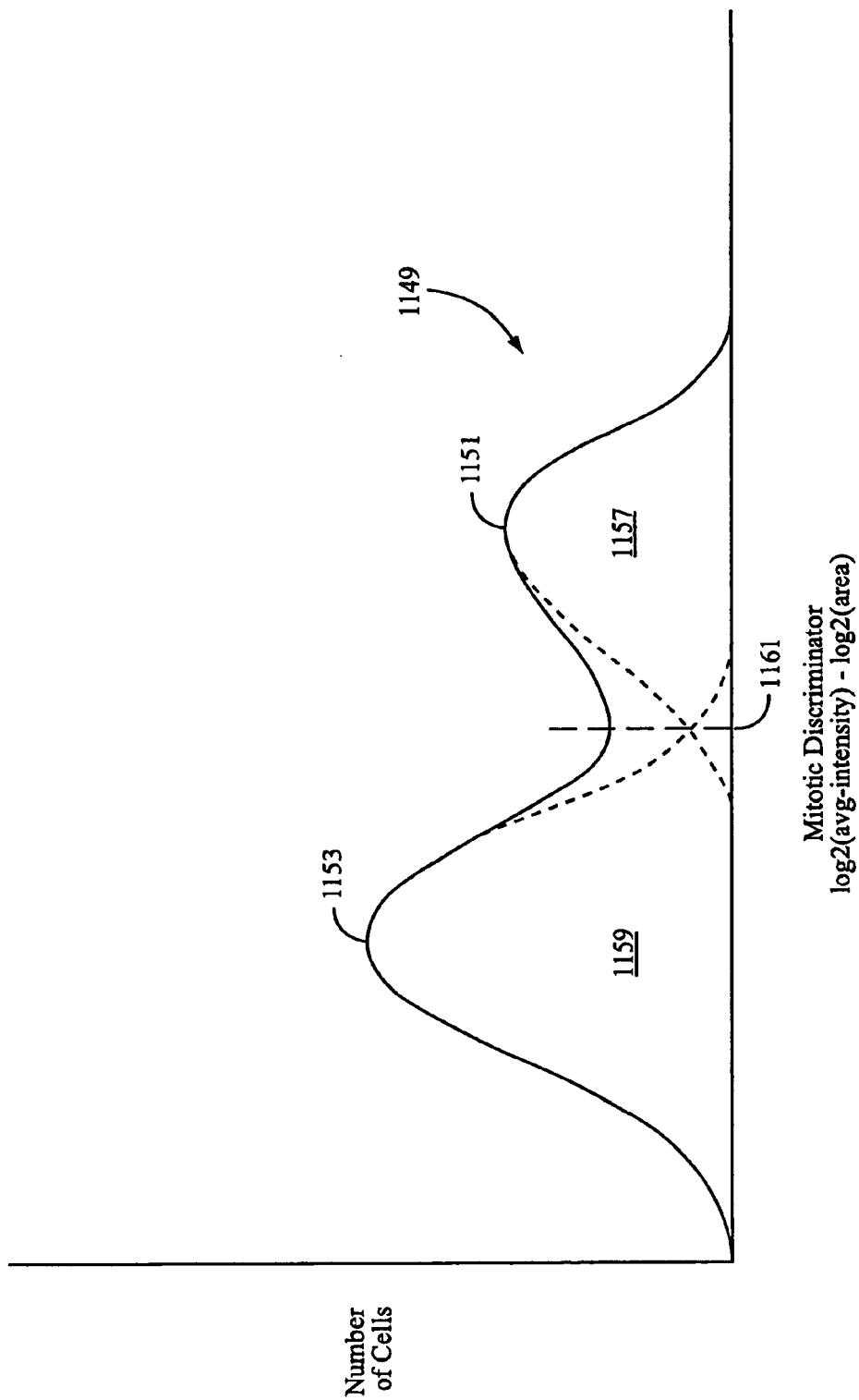
FIG. 11B is a distribution of a population of cells mapped according to a "mitotic discriminator" parameter that segregates cells into mitotic cells and interphase cells.

FIG. 11B shows application of a mixture model to discriminate between mitotic and interphase cells. This specific technique assumes that mitotic cells have small bright nuclei and interphase cells have larger diffuse nuclei. Consistent with this, a "mitotic discriminator" is defined. Such discriminator considers both the intensity and the size of the objects resulting from segmentation. Objects having small areas and high average intensities are deemed mitotic.

Objects having larger areas and lower average intensities are deemed interphase.

In a specific embodiment, the mitotic discriminator is defined by the following expression:

$$MD = \log_2(avg\_intensity) - \log_2(area)$$

where "avg_intensity" is the average intensity of the object under consideration and "area" is the total area of the object.

If one plots MD versus number of cells, a distribution 1149 such as that shown in FIG. 11B is obtained. This distribution includes a first peak 1151 and a second peak 1153. Peak 1151 represents typical mitotic phase cells, while peak 1153 represents typical interphase cells. Employing a mixture model as described above, one may obtain a component 1157 representing the mitotic population and a component 1159 representing the interphase population. The Gaussian representations of these components intersect at 1161, the designated cutoff point between mitotic and interphase cells.

There is a relationship between the DNA amount and the mitotic discriminator function. Note that log(total intensity)=log(average intensity)+log(area). And MD=log(average intensity)−log(area). The discriminators differ by the sign on the log(area) component. The correlation between the discriminators is [variance(log(average intensity))−variance(log(area))]/square root[variance(log(average intensity))*variance(log(area))]. This quantity is small when the variance(log(average intensity)) is approximately equal to variance(log(area)). This weak correlation implies that there is very little loss in breaking the classification analysis into two parts.

The ability of most techniques to accurately classify cell images depends on the number of samples in the population. Better results are obtained with larger populations. In some embodiments of this invention, suitably large populations may be comprised of samples from various sources. While it is generally preferable to use "similarly situated" samples as discussed above, it may sometimes be appropriate to aggregate cells from slightly different sources. For example, it may be desirable to aggregate cells from multiple wells of a single assay plate, where each well was treated with a different concentration of the same compound. In another example, the individual wells used all employ the same treatment but contain different strains of the same organism.

Note that some treatment or growth regimens may have highly unpredictable effects on the cell division cycle. In such situations, the resulting population of cell images may not conform to the expected physical model of the distribution of cells in various cell cycle phases. For example, a particular drug, with unknown effects, may arrest cell growth in the $G_2$ phase, thereby greatly reducing the number of mitotic cells in comparison to the typical cell population. If such population was used to develop a cell cycle phase classification for its members, the result could be inaccurate. Therefore, a control may be employed. The control will use untreated cells (when the effects of the treatment agent are unpredictable). Alternatively, the control may use cells treated with an agent or combination of agents having known effects (e.g., DMSO or Taxol (an anti-mitotic agent)) on cell growth and division. For some cell lines and/or relatively small populations, one or more of the cell growth stages may naturally have relatively low abundance. For example, mitotic stages typically are not well represented. In such cases, the control may be chosen to increase abundance in the naturally underrepresented stages. The resulting population will then present a better sample for accurate resolution by the mixture model. Note that if there were only $G_2/G_2M$ cells in the data, the distribution of log(total intensity) would contain only one peak and one would be unable to determine if the peak was the $G_1/G_1M$, S, or $G_2/G_2M$ peak.

In a particularly preferred embodiment, a calibrated cell population includes a dilution series. The dilution series includes multiple dilution groups, each including, for example, 8 wells on a plate. In this approach, all samples include the same cell line and same drug, but the drug is diluted over a wide range of concentrations. At the extreme of complete dilution, the cells are left untreated, except for exposure to DMSO. The cell images from each level of dilution are aggregated to obtain the entire population for analysis using a mixture model. This ensures a sufficiently large population for generating the mixture model. It increases the likelihood that all phases of the cell cycle are represented. It also reduces the likelihood that one or more phases from the cell cycle will be inadequately represented because a particular concentration of the drug strongly suppresses one or more cell growth stages. Thus, the chances of a calibration/annotation error are reduced.

A specific embodiment employs two separate control groups, one to provide discrimination between interphase stages and the other to provide discrimination between mitotic and interphase cells. The first group contains DMSO (a solvent used in all treatment wells and considered a neutral treatment). The second group contains Taxol (an anti-mitotic agent). A group dilution is run on each of these control groups. In the DMSO dilution group, the cells will contain all three groups: $G_1/G_1M$, S, and $G_2/G_2M$. The cutoffs between these groups (cutoffs A and B) can be saved from an analysis of this data. The other dilution group, containing Taxol, will arrest cells in mitosis at high concentrations. The distribution of MD over the Taxol is a mixture of two normal distributions. Running the expectation maximization algorithm on this data, one can obtain a cutoff between mitotic and interphase cells (cutoff C). Together the cutoffs from both dilution groups is used to classify cells. Cells with log(total intensity)<A and MD<C are classified as $G_1$ cells. Cells with a log(total intensity)<A and MD>C as classified as late phase mitotic cells. Cells with A<log(total intensity)<B are classified as S phase cells. Cells with log(total intensity)>B and MD<C are classified as G2 cells. And finally, cells with log(total intensity)>B and MD>C are classified as early phase mitotic cells. After all cells are so classified, proportions of each of the five classes are computed on a well by well basis.

Software/Hardware

Generally, embodiments of the present invention employ various processes involving data stored in or transferred through one or more computer systems. Embodiments of the present invention also relate to an apparatus for performing these operations. This apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will appear from the description given below.

In addition, embodiments of the present invention relate to computer readable media or computer program products that include program instructions and/or data (including data structures) for performing various computer-implemented operations. Examples of computer-readable media include, but are not limited to, magnetic media such as hard disks, floppy disks, and magnetic tape; optical media such as CD-ROM disks; magneto-optical media; semiconductor memory devices, and hardware devices that are specially configured to store and perform program instructions, such as read-only memory devices (ROM) and random access memory (RAM). The data and program instructions of this invention may also be embodied on a carrier wave or other transport medium. Examples of program instructions include both machine code, such as produced by a compiler, and files containing higher level code that may be executed by the computer using an interpreter.

Figure 13:
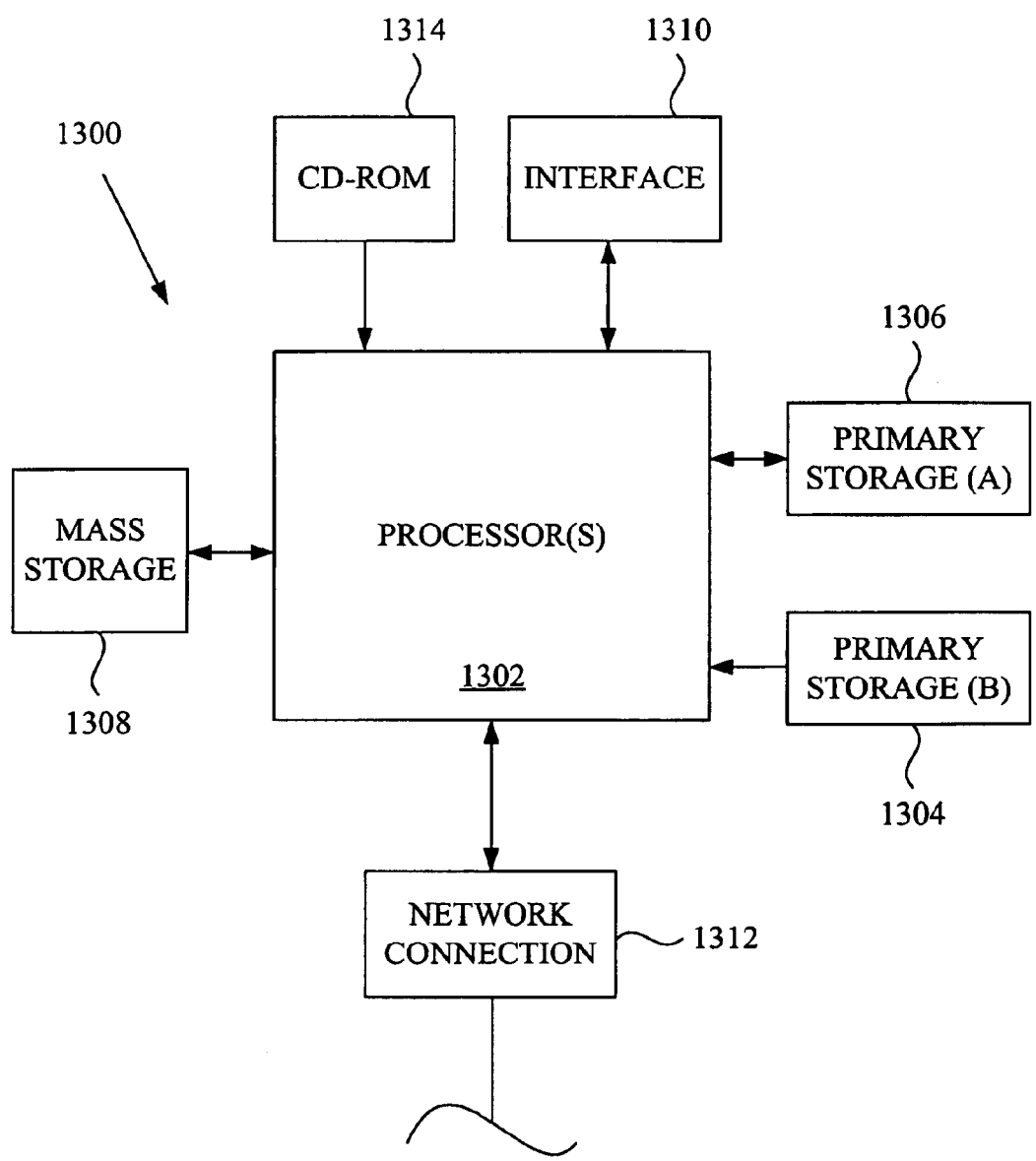
FIG. 13 is a block diagram of a computer system that may be used to implement various aspects of this invention such as the various image analysis algorithms of this invention.

FIG. 13 illustrates a typical computer system that, when appropriately configured or designed, can serve as an image analysis apparatus of this invention. The computer system 1300 includes any number of processors 1302 (also referred to as central processing units, or CPUs) that are coupled to storage devices including primary storage 1306 (typically a random access memory, or RAM), primary storage 1304 (typically a read only memory, or ROM). CPU 1302 may be of various types including microcontrollers and microprocessors such as programmable devices (e.g., CPLDs and FPGAs) and unprogrammable devices such as gate array ASICs or general purpose microprocessors. As is well known in the art, primary storage 1304 acts to transfer data and instructions uni-directionally to the CPU and primary storage 1306 is used typically to transfer data and instructions in a bi-directional manner. Both of these primary storage devices may include any suitable computer-readable media such as those described above. A mass storage device 1308 is also coupled bi-directionally to CPU 1302 and provides additional data storage capacity and may include any of the computer-readable media described above. Mass storage device 1308 may be used to store programs, data and the like and is typically a secondary storage medium such as a hard disk. It will be appreciated that the information retained within the mass storage device 1308, may, in appropriate cases, be incorporated in standard fashion as part of primary storage 1306 as virtual memory. A specific mass storage device such as a CD-ROM 1314 may also pass data uni-directionally to the CPU.

CPU 1302 is also coupled to an interface 1310 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1302 optionally may be coupled to an external device such as a database or a computer or telecommunications network using an external connection as shown generally at 1312. With such a connection, it is contemplated that the CPU might receive information from the network, or might output information to the network in the course of performing the method steps described herein.

In one embodiment, the computer system 1300 is directly coupled to an image acquisition system such as an optical imaging system that captures images of cells. Digital images from the image generating system are provided via interface 1312 for image analysis by system 1300. Alternatively, the images processed by system 1300 are provided from an image storage source such as a database or other repository of cell images. Again, the images are provided via interface 1312. Once in the image analysis apparatus 1300, a memory device such as primary storage 1306 or mass storage 1308 buffers or stores, at least temporarily, digital images of the cell. Typically, the cell images will show locations where DNA exists within the cells. In these images, local values of a DNA image parameter (e.g., radiation intensity) correspond to amounts of DNA at the locations within the cell shown on the image. With this data, the image analysis apparatus 1300 can perform various image analysis operations such as distinguishing between mitotic and interphase cells, estimating the amount of DNA in a cell, and classifying a cell in a particular cell division or cell growth state. To this end, the processor may perform various operations on the stored digital image. For example, it may analyze said image in manner that extracts values of one or more mitosis indicator parameters that correspond to a cell division state and classifies the cell as either mitotic or interphase based upon the extracted values of the one or more mitosis indicator parameters. Alternatively, or in addition, it may estimate a total value of the DNA image parameter taken over at least a region of the cell where DNA is deemed to be present.

EXAMPLES

FIGS. 14A–14G depict the results of an experiment in which human lung cancer epithelial cells were treated with Taxol and the effect of Taxol on the cell cycle was characterized. The specific cells used in this study were from Cell Line A549 (human lung cancer epithelial cells) (ATCC:CCL-185). Two day staged cell cultures of the A549 cells were trypsinized for five minutes from T175 cm flasks. The cells were then suspended in ten milliliters of RPMI media with ten percent serum and counted using both a hemocytometer and Coulter Counter. The suspension was diluted further in media to ensure that there were 1600 cells per twenty microliters in suspension. The cells were then counted again. Thereafter, they were transferred to a Cell Stir and kept in suspension while being plated into barcoded 384 well plates using a MultiDrop at twenty microliters per well. The plates were transferred to a humidified carbon dioxide incubator to recover for twenty-four hours before the addition of Taxol or DMSO. Prior to imaging the cells were treated with DAPI to stain DNA. Cells from each well were then imaged.

Figure 14A:
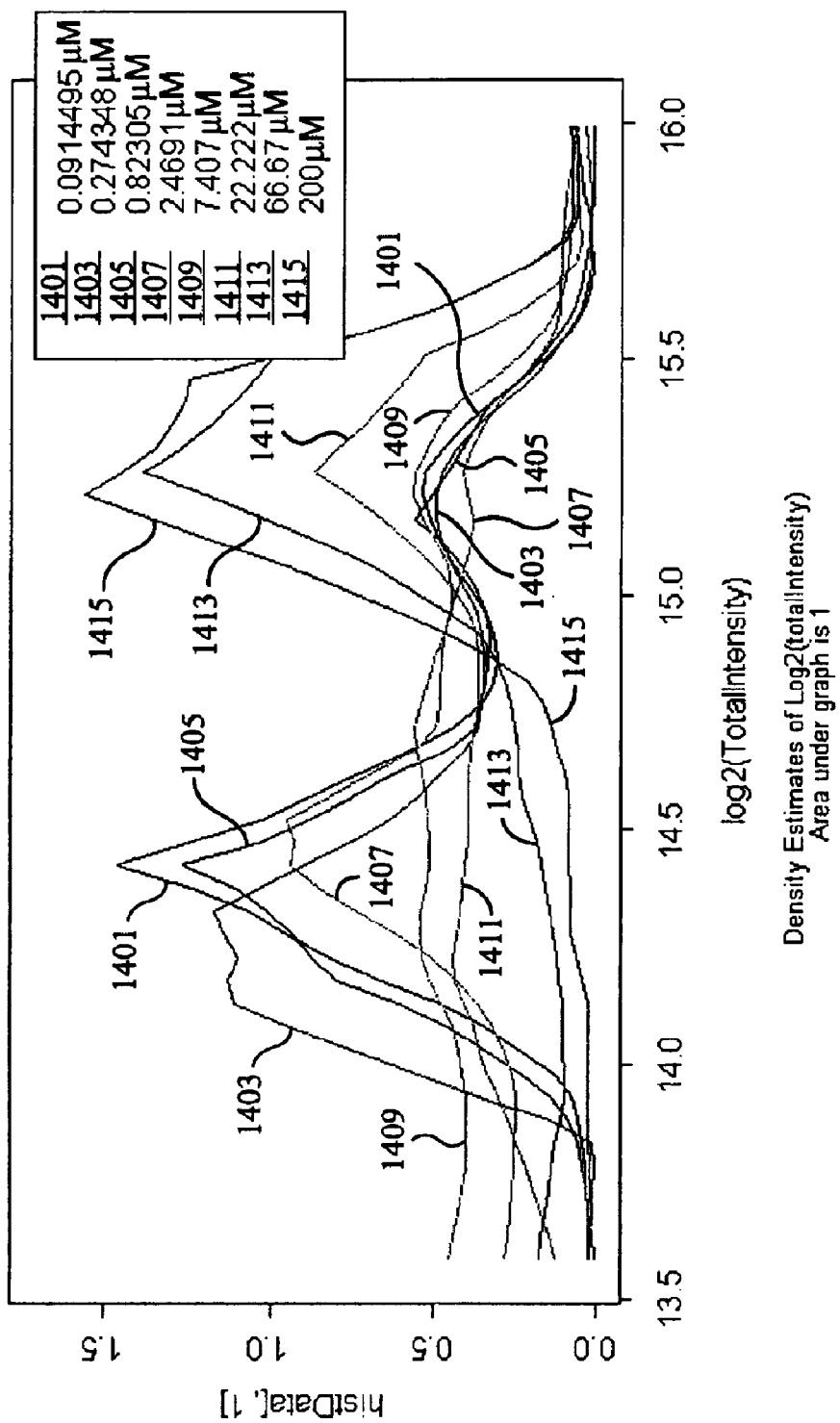
FIG. 14A is a total intensity histogram showing how cells of a population are distributed differently when exposed to differing concentrations of Taxol.

Of relevance to this example, eight wells were treated with Taxol at varying concentrations and eight other "control" wells were treated with DMSO, which is not toxic to the cells under consideration. The concentration of Taxol varied from approximately 0.09 micromolar to 200 micromolar. FIG. 14A shows how the concentration of Taxol affects the distribution of cells based upon the amount of DNA contained in each cell. Cells in each of the eight Taxol wells were separately imaged and the total measured intensity in each cell was recorded. As discussed above, the total intensity corresponds to the amount of DNA in each cell. A histogram of cell count versus $\log_2$ (total intensity) was prepared as shown in FIG. 14A. In the histogram, the cell count has been normalized so that the area under each curve was equal to a value of one.

As shown, the Taxol concentration has a strong influence on the amount of DNA contained in a typical cell. At low concentrations, the cells in a sample assume a near typical distribution in which there are large numbers of $G_1$ and $G_2$ phase cells. As explained above, this condition is represented by two peaks in the total intensity histogram. The peak with the lower intensity represents $G_1$ phase cells and the peak with the higher intensity represents $G_2$ phase cells. Initially, at low concentrations of Taxol, the size of the $G_1$ peak is larger. As the concentration of Taxol increases, the second peak becomes more pronounced with respect to the first peak. At very high Taxol concentrations, there are very few $G_1$ cells. In other words, the relative numbers of $G_2$ and $G_1$ phase cells become skewed in favor $G_2$ phase cells. This suggests that Taxol arrests cells in the $G_2$ phase.

Figure 14B:
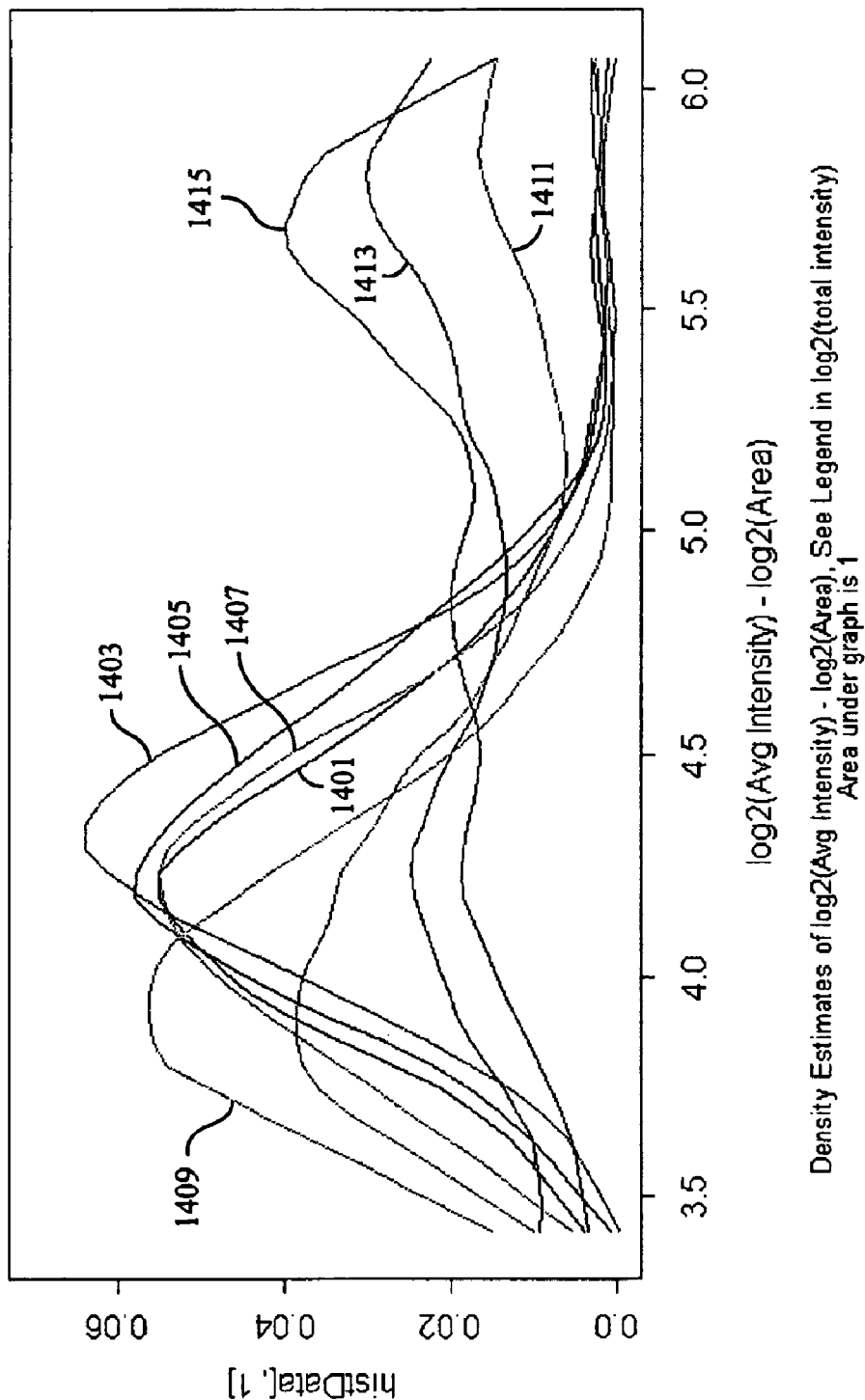
FIG. 14B is a histogram showing how cells of a population are distributed differently between the mitotic and interphase stages when exposed to differing concentrations of Taxol.

FIG. 14B shows how Taxol affects a mitotic discriminator. The data used to produce the histogram of FIG. 14B was taken from the same images of the eight Taxol containing wells used to produce the histogram of FIG. 14A. In this histogram, the mitotic discriminator is defined as $\log_2$ (average intensity) minus $\log_2$(area). A cell count histogram based on this mitotic discriminator typically shows two peaks, one for mitotic cells (higher value of MD) and another for interphase cells (lower value of MD). As shown in FIG. 14B, the higher concentrations of Taxol tends to greatly increase the relative incidence of mitotic cells.

Figure 14C:
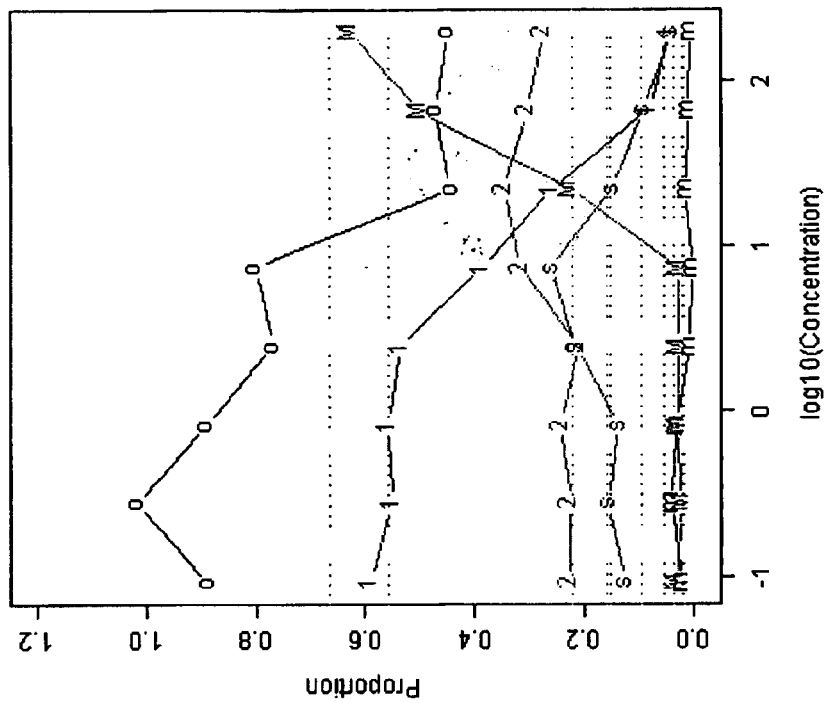
FIG. 14C presents graphs showing how cell populations are distributed between $G_1$, S, $G_2$, telophase, and other mitotic phases as a function of Taxol concentration.
Figure 14C:
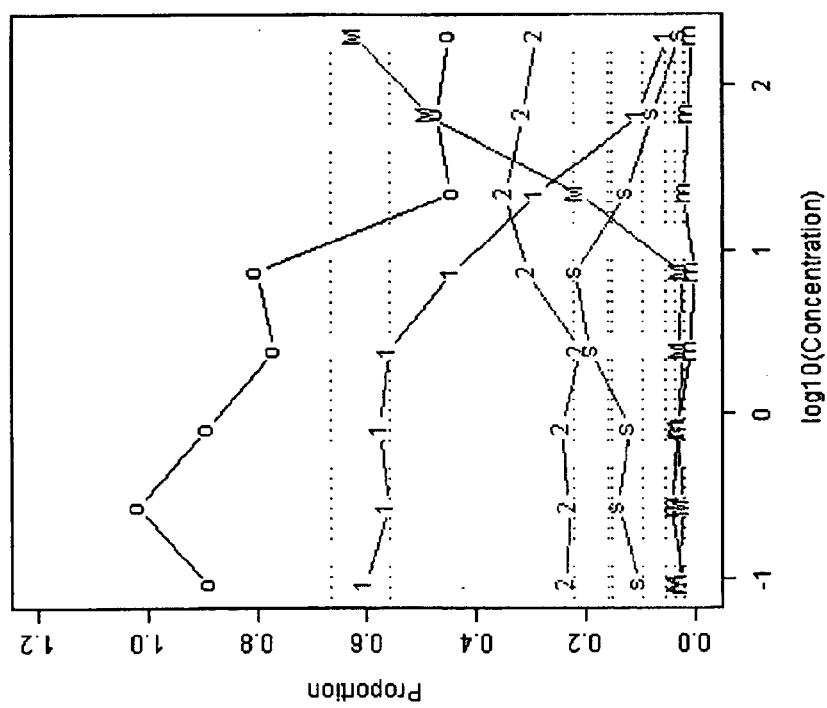

FIG. 14C shows two graphs depicting the relative proportions of cells in each of five cell cycle phases as a function of Taxol concentration. The five phases are $G_1$, S, $G_2$, m (telophase), and M (prophase, metaphase, and anaphase). The cell classifications were derived from the data used to construct the histograms of FIGS. 14A and 14B. The graph on the left used a "dilution group" to classify the individual cells of the images. The graph on the right used a "control" to classify the individual cells. The control employed cell images from the DMSO treated wells. As discussed above, a dilution group employs cell images from each of a series of dilutions to yield a population that is then used to find cutoff points between each of the various cell cycle phases. A control algorithm employs a set of control images for this purpose. The control images are derived using no agent (Taxol) and/or an agent having a known affect (DMSO). Note that the cell classifications developed using each of the two methods are remarkably similar.

In the graphs, there is a curve with points labeled "o." These are defined as the number of objects divided by the average number of DMSO objects. The number of DMSO objects is the number of "cells" identified in an image of a well. This number is averaged over the eight DMSO wells to obtain the denominator. The numerator is the number of objects identified in each image of the Taxol containing wells. As shown in FIG. 14C, the number of such objects decreases with increasing concentration of Taxol. Because these objects correspond to living cells, the "o" curves indicate that more lung cancer cells die with increasing concentrations of Taxol.

Figure 14D:
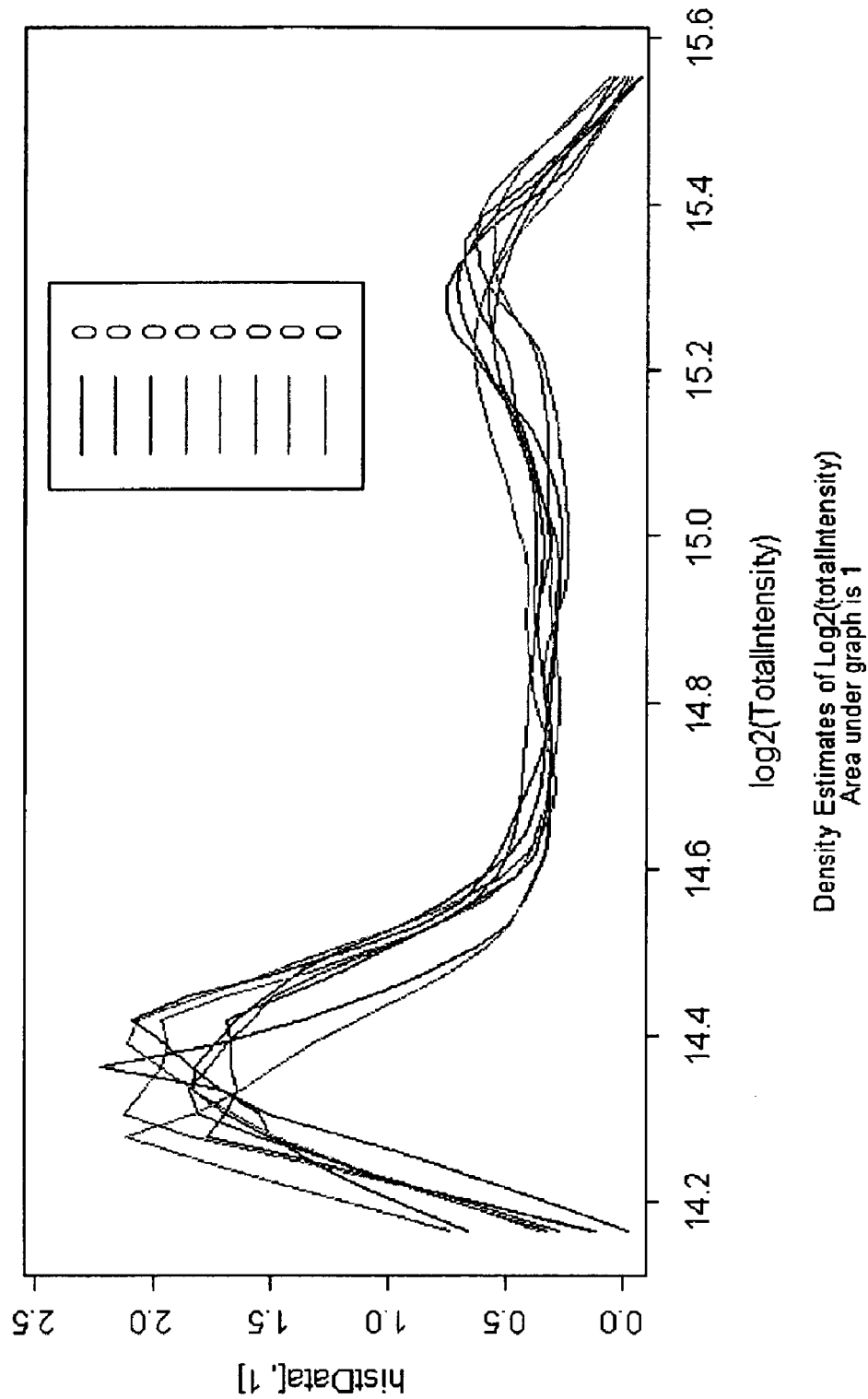
FIG. 14D is a total intensity histogram showing how cells of a population are distributed when treated only with DMSO.

FIG. 14D is a histogram showing cell count versus $\log_2$(total intensity) for each of eight images taken from eight different wells, each treated with DMSO and no Taxol. These images were used for the control algorithm discussed above. Note the two characteristic peaks for $G_1$ and $G_2$ phase cells. Note also the strong similarities in the curves from each of the eight images.

Figure 14E:
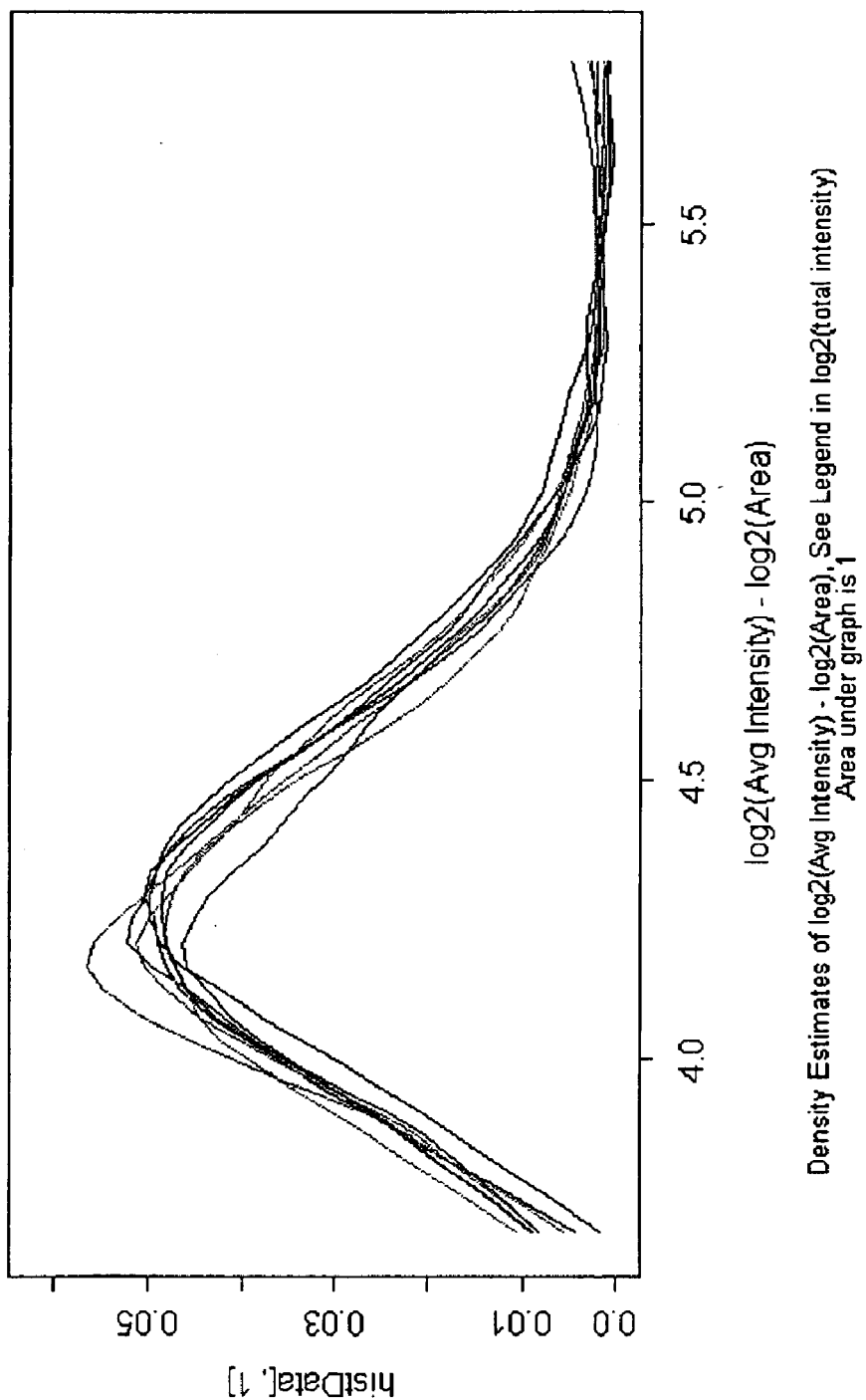
FIG. 14E is a histogram showing how cells of a population are distributed between the mitotic and interphase stages when exposed to only DMSO.

FIG. 14E is a histogram showing cell count versus the mitotic discriminator (described above) for each of the eight images of FIG. 14D. As expected, most of the cells reside in the interphase state and only a few reside in the mitotic state. Further, proportions of cells in these states are quite similar for each of the eight images.

Figure 14F:
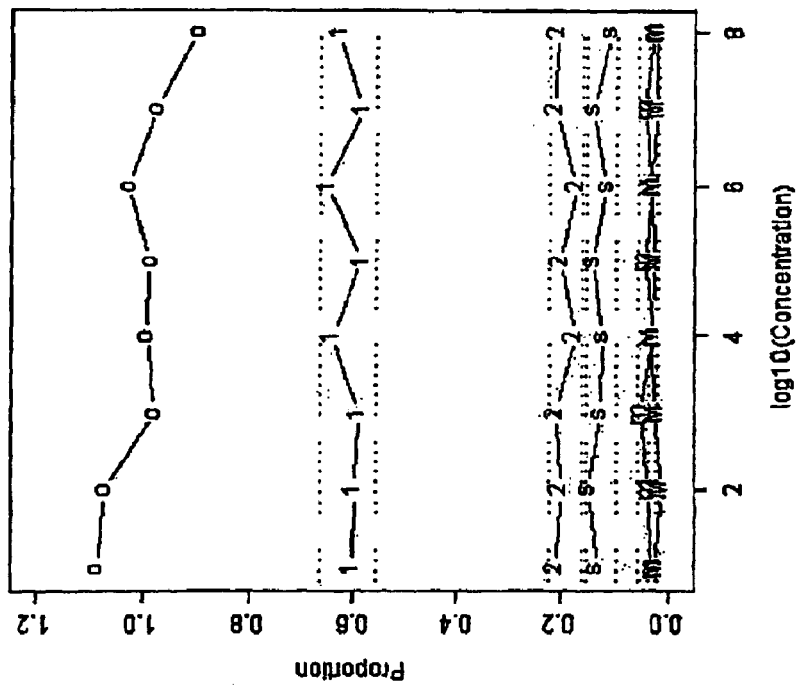
FIG. 14F presents graphs showing how cell populations are distributed between $G_1$, S, $G_2$, telophase, and other mitotic phases within eight different wells, all treated with DMSO (no Taxol).
Figure 14F:
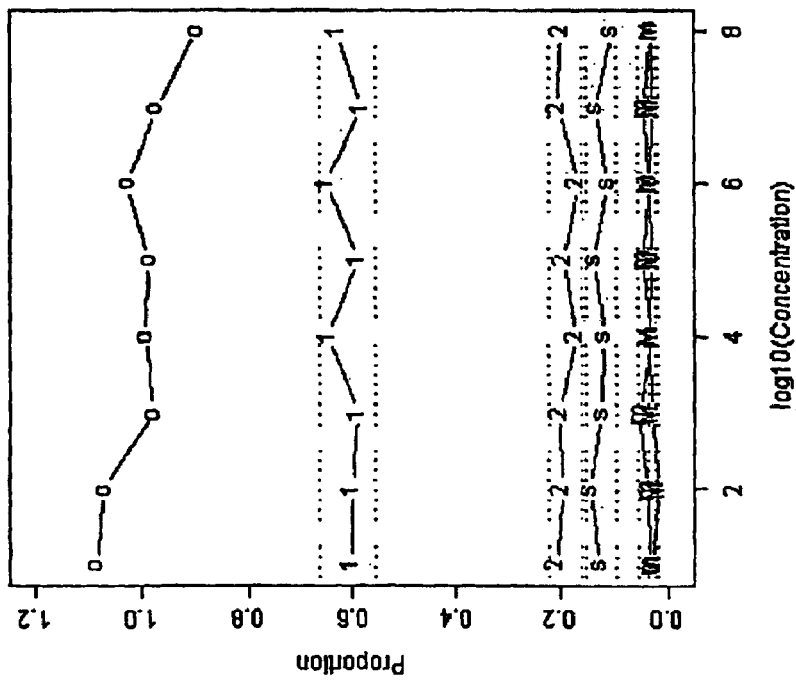

FIG. 14F presents two graphs depicting the relative proportions of cells in each of five cell cycle phases as a function of well number. These graphs are similar to those shown in FIG. 14C, but there is no change in the concentration of applied agent; all use a single concentration of DMSO. Not surprisingly, the relative proportions of cells in each of the five phases remain relatively constant. The total number of objects, o, varies slightly about the mean.

Figure 14G:
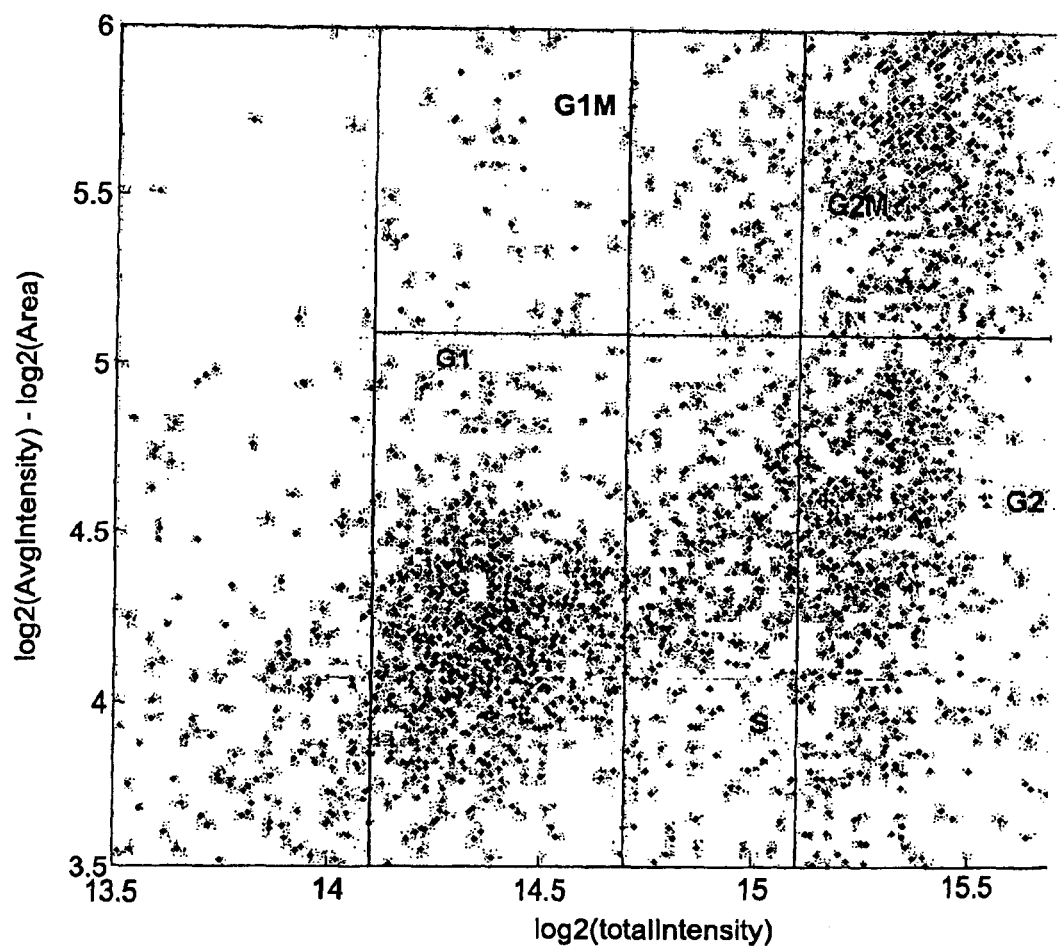
FIG. 14G is a plot showing how the cells treated with Taxol distribute themselves between cell cycle stages when plotted according to a mitotic discriminator and total intensity.

FIG. 14G is a scatter plot showing how image objects distribute themselves as a function of $\log_2$ (total intensity) and MD ($\log_2$ (average intensity) minus $\log_2$ (area)). The cutoff points between the various cell cycle stages, derived as discussed above, are shown in the Figure.

Although the above has generally described the present invention according to specific processes and apparatus, the present invention has a much broader range of applicability. In particular, the present invention is not-limited to a particular kind of data about a particular cell, but can be applied to virtually any cellular data where an understanding about the workings of the cell is desired. Thus, in some embodiments, the techniques of the present invention could provide information about many different types or groups of cells, substances, and genetic processes of all kinds. Of course, one of ordinary skill in the art would recognize other variations, modifications, and alternatives.

What is claimed is:

1. A method of estimating an amount of DNA in a cell and using that estimate to characterize the cell, the method comprising:

receiving an image of the cell, in which local values of a DNA image parameter correspond to amounts of DNA at the locations within the cell shown on the image;

automatically estimating a total value of the DNA image parameter taken over at least a region of the cell where DNA is deemed to be present to thereby determine a total amount of DNA in the cell;

automatically extracting a mitosis indicator parameter from the image of the cell; and automatically determining whether the cell is a G1 phase cell, an S phase cell, a G2 phase cell, or an M phase cell using the total amount of DNA in the cell in combination with the mitosis indicator parameter.

2. The method of claim 1, wherein the image of the cell is a digital representation of the cell.

3. The method of claim 1, wherein the cell is treated with an agent that selectively associates with DNA and emits a signal recorded as the DNA image parameter.

4. The method of claim 3, wherein the agent is a DNA stain.

5. The method of claim 1, wherein the DNA image parameter is a light or radiation intensity.

6. The method of claim 1, wherein the DNA image parameter is an electromagnetic radiation intensity provided at a particular wavelength or range of wavelengths.

7. The method of claim 1, wherein estimating the total value of the DNA image parameter comprises summing a per pixel value of the DNA image parameter over all pixels in the region of the cell where DNA is deemed to be present.

8. The method of claim 7, wherein the per pixel value of the DNA image parameter comprises a corrected per pixel intensity value.

9. The method of claim 8, wherein the corrected per pixel intensity value comprises the difference of an absolute pixel intensity value and an image background level.

10. The method of claim 9, wherein the corrected per pixel intensity value comprises the difference corrected for non-linearities in an image acquisition system used to produce the image of the cell.

11. The method of claim 1, further comprising converting the estimated total value of the DNA image parameter to an estimated value of the total DNA in the region where DNA is deemed to be present.

12. The method of claim 1, wherein the region of the cell where DNA is deemed to be present is the cell nucleus.

13. The computer program product of claim 1, wherein the region of the cell where DNA is deemed to be present is the cell nucleus.

14. A computer program product comprising a machine readable medium on which is provided program instructions for estimating an amount of DNA in a cell and using that estimate to characterize the cell, the instructions comprising:
- code for receiving an image of the cell, in which local values of a DNA image parameter correspond to amounts of DNA at the locations within the cell shown on the image;
- code for automatically estimating a total value of the DNA image parameter taken over at least a region of the cell where DNA is deemed to be present to thereby determine a total amount of DNA in the cell;
- code for automatically extracting a mitosis indicator parameter from the image of the cell; and
- code for automatically determining whether the cell is a G1 phase cell, an S phase cell, a G2 phase cell, or an M phase cell using the total amount of DNA in the cell in combination with the mitosis indicator parameter.

15. The computer program product of claim 14, wherein the image of the cell is a digital representation of the cell.

16. The computer program product of claim 14, wherein the cell is treated with an agent that selectively associates with DNA and emits a signal recorded as the DNA image parameter.

17. The computer program product of claim 16, wherein the agent is a DNA stain.

18. The computer program product of claim 14, wherein the DNA image parameter is a light or radiation intensity.

19. The computer program product of claim 14, wherein the DNA image parameter is an electromagnetic radiation intensity provided at a particular wavelength or range of wavelengths.

20. The computer program product of claim 14, wherein estimating the total value of the DNA image parameter comprises summing a per pixel value of the DNA image parameter over all pixels in the region of the cell where DNA is deemed to be present.

21. The computer program product of claim 20, wherein the per pixel value of the DNA image parameter comprises a corrected per pixel intensity value.

22. The computer program product of claim 21, wherein the corrected per pixel intensity value comprises the difference of an absolute pixel intensity value and an image background level.

23. The computer program product of claim 22, wherein the corrected per pixel intensity value comprises the difference corrected for non-linearities in an image acquisition system used to produce the image of the cell.

24. The computer program product of claim 14, further comprising program instructions for converting the estimated total value of the DNA image parameter to an estimated value of the total DNA in the region where DNA is deemed to be present.

25. An image analysis apparatus for estimating the amount of DNA in a cell and using that estimate to characterize the cell, the apparatus comprising:
- a memory or buffer adapted to store, at least temporarily, an image of the cell, in which image local values of a DNA image parameter correspond to amounts of DNA at the locations within the cell shown on the image; and
- a processor configured or designed to (i) automatically estimate a total value of the DNA image parameter taken over at least a region of the cell where DNA is deemed to be present to thereby determine a total amount of DNA in the cell, (ii) automatically extracting a mitosis indicator parameter from the image of the cell; and (iii) automatically determining whether the cell is a G1 phase cell, an S phase cell, a G2 phase cell, or an M phase cell using the total amount of DNA in the cell in combination with the mitosis indicator parameter.

26. The apparatus of claim 25, further comprising an interface adapted to receive the image of the cell.

27. The apparatus of claim 25, further comprising an image acquisition system that produces the image of the cell.

28. The apparatus of claim 25, wherein the cell is treated with an agent that selectively associates with DNA and emits a signal recorded as the DNA image parameter.

29. The apparatus of claim 25, wherein the DNA image parameter is a light or radiation intensity.

30. The apparatus of claim 25, wherein the processor estimates the total value of the DNA image parameter by summing a per pixel value of the DNA image parameter over all pixels in the region of the cell where DNA is deemed to be present.

31. The apparatus of claim 30, wherein the per pixel value of the DNA image parameter comprises a corrected per pixel intensity value.

32. The apparatus of claim 31, wherein the corrected per pixel intensity value comprises the difference of an absolute pixel intensity value and an image background level, which difference is corrected for non-linearities in an image acquisition system used to produce the image.

33. The apparatus of claim 25, wherein the processor also converts the estimated total value of the DNA image parameter to an estimated value of the total DNA in the cell.

34. A method of distinguishing between mitotic and interphase cells, the method comprising:
- receiving an image of a cell;
- from the image, automatically extracting values of one or more mitosis indicator parameters that correspond to a cell division state of the cell; and
- automatically classifying the cell as either mitotic or interphase based upon the extracted values of the one or more mitosis indicator parameters,
    - wherein the mitosis indicator parameter specifies at least one of the following: a statistical variance in DNA concentration within the cell, the size of a region occupied by DNA within the cell, an average concentration of DNA within the cell, and a maximal concentration of DNA within the cell.

35. The method of claim 34, wherein the image of the cell is a digital representation of the cell.

36. The method of claim 34, wherein the cell is treated with an agent that selectively associates with DNA and emits a signal recorded as a location of DNA within the cell.

37. The method of claim 34, wherein the signal is an electromagnetic radiation intensity.

38. The method of claim 34, wherein the agent is a DNA stain.

39. The method of claim 34, wherein the one or more mitosis indicator parameters include at least a statistical variance in DNA concentration within the cell.

40. The method of claim 34, wherein classifying the cell as either mitotic or interphase comprises evaluating the one or more mitosis indicator parameters to determine a degree to which DNA within the cell has separated.

41. The method of claim 34, wherein classifying the cell as either mitotic or interphase comprises evaluating the one or more mitosis indicator parameters to determine a degree to which DNA within the cell has condensed into chromosomes.

42. The method of claim 34, wherein classifying the cell as either mitotic or interphase comprises evaluating the one or more mitosis indicator parameters to determine a degree to which DNA within the cell has concentrated into one or more discrete locations.

43. The method of claim 34, further comprising classifying a mitotic cell as pre or post-anaphase.

44. The method of claim 34, wherein classifying the cell as either mitotic or interphase comprises using a mixture model to operate on the values of the one or more mitosis indicator parameters for a population of cells.

45. The method of claim 34, wherein the image of the cell shows locations where the DNA exists within the cell.

46. A computer program product comprising a machine readable medium on which is provided instructions for distinguishing between mitotic and interphase cells, the instructions comprising:
   code for receiving an image of a cell;
   code for automatically extracting, from the image, values of one or more mitosis indicator parameters that correspond to a cell division state of the cell; and
   code for automatically classifying the cell as either mitotic or interphase based upon the extracted values of the one or more mitosis indicator parameters,
      wherein the mitosis indicator parameter specifies at least one of the following: a statistical variance in DNA concentration within the cell, the size of a region occupied by DNA within the cell, an average concentration of DNA within the cell, and a maximal concentration of DNA within the cell.

47. The computer program product of claim 46, wherein the image of the cell is a digital representation of the cell.

48. The computer program product of claim 46, wherein the cell is treated with an agent that selectively associates with DNA and emits a signal recorded as a location of DNA within the cell.

49. The computer program product of claim 46, wherein the signal is an electromagnetic radiation intensity.

50. The computer program product of claim 46, wherein the agent is a DNA stain.

51. The computer program product of claim 46, wherein the one or more mitosis indicator parameters include at least a statistical variance in DNA concentration within the cell.

52. The computer program product of claim 46, wherein classifying the cell as either mitotic or interphase comprises evaluating the one or more mitosis indicator parameters to determine a degree to which DNA within the cell has separated.

53. The computer program product of claim 46, wherein classifying the cell as either mitotic or interphase comprises evaluating the one or more mitosis indicator parameters to determine a degree to which DNA within the cell has condensed into chromosomes.

54. The computer program product of claim 46, wherein classifying the cell as either mitotic or interphase comprises evaluating the one or more mitosis indicator parameters to determine a degree to which DNA within the cell has concentrated into one or more discrete locations.

55. The computer program product of claim 46, further comprising program instructions for classifying a mitotic cell as pre or post-anaphase.

56. The computer program product of claim 46, wherein classifying the cell as either mitotic or interphase comprises using a mixture model to operate on the values of the one or more mitosis indicator parameters for a population of cells.

57. The computer program product of claim 46, wherein the image of the cell shows locations where the DNA exists within the cell.

58. An image analysis apparatus for distinguishing between mitotic and interphase cells, the apparatus comprising:
   a memory or buffer adapted to store, at least temporarily, an image of a cell; and
   a processor configured or designed to automatically analyze said image in manner that extracts values of one or more mitosis indicator parameters that correspond to a cell division state and automatically classifies the cell as either mitotic or interphase based upon the extracted values of the one or more mitosis indicator parameters,
      wherein the mitosis indicator parameter specifies at least one of the following: a statistical variance in DNA concentration within the cell, the size of a region occupied by DNA within the cell, an average concentration of DNA within the cell, and a maximal concentration of DNA within the cell.

59. The apparatus of claim 58, further comprising an interface adapted to receive the image of the cell.

60. The apparatus of claim 58, further comprising an image acquisition system that produces the image of the cell.

61. The apparatus of claim 58, wherein the cell is treated with an agent that selectively associates with DNA and emits a signal recorded as a location of DNA within the cell.

62. The apparatus of claim 58, wherein the one or more mitosis indicator parameters include at least a statistical variance in DNA concentration within the cell.

63. The apparatus of claim 58, wherein the processor classifies the cell as either mitotic or interphase by evaluating the one or more mitosis indicator parameters to determine a degree to which DNA within the cell has condensed into chromosomes.

64. The apparatus of claim 58, wherein the processor classifies the cell as either mitotic or interphase by evaluating the one or more mitosis indicator parameters to determine a degree to which DNA within the cell has concentrated into one or more discrete locations.

65. The apparatus of claim 58, wherein the image of the cell shows locations where the DNA exists within the cell.

66. A method of classifying a cell based on an image of that cell, the method comprising:
   receiving an image of a cell showing locations where nuclear DNA exists within the cell and also showing local amounts of the nuclear DNA;
   from the image, automatically extracting values of one or more mitosis indicator parameters that correspond to a cell division state of the cell, wherein the mitosis indicator parameter specifies at least one of the following: a statistical variance in DNA concentration within the cell, the size of a region occupied by DNA within the cell, an average concentration of DNA within the cell, and a maximal concentration of DNA within the cell;
   from the image, automatically estimating a total amount of DNA in the cell; and
   automatically classifying the cell into a cell cycle phase based upon the one or more mitosis indicator parameters and total amount of DNA.

67. The method of claim 66, wherein the classifying discriminates between at least the cell cycle phases $G_1$, S, $G_2$, and mitotic.

68. The method of claim 67, wherein the classifying discriminates between at least the cell cycle phases $G_1$, S, $G_2$, pre-anaphase mitotic, and post-anaphase mitotic.

69. The method of claim 66, wherein classifying the cell comprises comparing at least one of the amount of DNA and the one or more mitosis indicator parameters to a model providing boundaries between certain cell cycle phases in parameter space.

70. The method of claim 69, further comprising generating the model from a population of cell images, for which the one or more mitosis indicator parameters have been extracted and the amount of DNA has been estimated.

71. The method of claim 70, wherein the model is generated using a mixture model.

72. The method of claim 70, wherein the population used to generate the model is an aggregation of cell images taken from multiple sources.

73. The method of claim 72, wherein the multiple sources are multiple wells on an assay plate.

74. The method of claim 70, wherein the population used to generate the model is a collection of images of control cells having a known distribution of cell cycle phases.

75. A computer program product comprising a machine readable medium on which is provided instructions for of classifying a cell based on an image of that cell, the instructions comprising:
receiving an image of a cell showing locations where nuclear DNA exists within the cell and also showing local amounts of the nuclear DNA;
from the image, automatically extracting values of one or more mitosis indicator parameters that correspond to a cell division state of the cell, wherein the mitosis indicator parameter specifies at least one of the following: a statistical variance in DNA concentration within the cell, the size of a region occupied by DNA within the cell, an average concentration of DNA within the cell, and a maximal concentration of DNA within the cell;
from the image, automatically estimating a total amount of DNA in the cell; and
automatically classifying the cell into a cell cycle phase based upon the one or more mitosis indicator parameters and total amount of DNA.

76. The computer program product of claim 75, wherein the classifying discriminates between at least the cell cycle phases $G_1$, S, $G_2$, and mitotic.

77. The computer program product of claim 76, wherein the classifying discriminates between at least the cell cycle phases $G_1$, S, $G_2$, pre-anaphase mitotic, and post-anaphase mitotic.

78. The computer program product of claim 75, wherein classifying the cell comprises comparing at least one of the amount of DNA and the one or more mitosis indicator parameters to a model providing boundaries between certain cell cycle phases in parameter space.

79. The computer program product of claim 78, further comprising program instructions for generating the model from a population of cell images, for which the one or more mitosis indicator parameters have been extracted and the amount of DNA has been estimated.

80. The computer program product of claim 79, wherein the model is generated using a mixture model.

81. The computer program product of claim 79, wherein the population used to generate the model is an aggregation of cell images taken from multiple sources.

82. The computer program product of claim 81, wherein the multiple sources are multiple wells on an assay plate.

83. The computer program product of claim 79, wherein the population used to generate the model is a collection of images of control cells having a known distribution of cell cycle phases.

84. An image analysis apparatus for distinguishing between mitotic and interphase cells, the apparatus comprising:
a memory or buffer adapted to store, at least temporarily, an image of a cell showing locations where nuclear DNA exists within the cell and also showing local amounts of the nuclear DNA; and
a processor configured or designed to (a) analyze said image in manner that automatically extracts values of one or more mitosis indicator parameters that correspond to a cell division state, (b) automatically estimate a total amount of DNA in the cell, and (c) automatically classifying the cell into a cell cycle phase based upon the one or more mitosis indicator parameters and total amount of DNA, wherein the mitosis indicator parameter specifies at least one of the following: a statistical variance in DNA concentration within the cell, the size of a region occupied by DNA within the cell, an average concentration of DNA within the cell, and a maximal concentration of DNA within the cell.

85. The apparatus of claim 84, further comprising an interface adapted to receive the image of the cell.

86. The apparatus of claim 84, further comprising an image acquisition system that produces the image of the cell.

87. The apparatus of claim 84, wherein the cell is treated with an agent that selectively associates with DNA and emits a signal recorded as a location of DNA within the cell.

88. The apparatus of claim 84, wherein the processor classifies the cell as either mitotic or interphase by evaluating the one or more mitosis indicator parameters to determine a degree to which DNA within the cell has condensed into chromosomes.

89. The apparatus of claim 84, wherein the processor estimates the total amount of the DNA in the cell by summing a per pixel value of a DNA image parameter over all pixels in the region of the cell where DNA is deemed to be present, wherein the DNA image parameter corresponds to amounts of DNA at the locations within the cell shown on the image.

90. The apparatus of claim 89, wherein the cell is treated with an agent that selectively associates with DNA and emits a signal recorded as the DNA image parameter.

91. The apparatus of claim 89, wherein the per pixel value of the DNA image parameter comprises a corrected per pixel intensity value.

92. The apparatus of claim 91, wherein the corrected per pixel intensity value comprises the difference of an absolute pixel intensity value and an image background level.

93. A computer assisted method of determining parameters for classifying cells into stages of the cell cycle, the method comprising:
obtaining cell images for a population of cells;
organizing the cell images based upon (i) an amount of DNA in the cells and (ii) a mitotic discriminator for the cell images; and
from the resulting organization of cell images, determining said parameters for classifying the cells into stages of the cell cycle,
wherein the mitotic discriminator includes at least one of a variance in DNA concentration within the cell, the size of a region occupied by DNA within the cell, and a maximal concentration of DNA within the cell.

94. The method of claim 93, wherein the population of cells includes cells treated under control conditions.

95. The method of claim 93, wherein the population of cells includes a first set of cells treated with a first concentration of a biologically active agent and a second set of cells treated with a second concentration of the biologically active agent.

96. The method of claim 95, wherein the population of cells further includes a third set of cells treated under control conditions.

97. The method of claim 93, wherein determining said parameters for classifying the cells into stages of the cell cycle comprises applying a mixture model to the organization of cell images.

98. The method of claim 97, wherein determining said parameters for classifying the cells into stages of the cell cycle comprises employing an expectation maximization fitting technique to the mixture model.

99. The method of claim 93, wherein said parameters for classifying the cells into stages of the cell cycle allow classification of cells into at least the following stages: $G_1$, S, $G_2$, and mitotic.

100. The method of claim 93, wherein said parameters for classifying the cells into stages of the cell cycle allow classification of cells into at least the following stages: $G_1$, S, $G_2$, and pre-anaphase mitotic and post-anaphase mitotic.

101. A computer program product comprising a machine readable medium on which is provided instructions for determining parameters for classifying cells into stages of the cell cycle, the instructions comprising:
   code for obtaining cell images for a population of cells;
   code for organizing the cell images based upon (i) an amount of DNA in the cells and (ii) a mitotic discriminator for the cell images; and
   code for determining said parameters for classifying the cells into stages of the cell cycle based on the organization of cell images,
      wherein the mitotic discriminator includes at least one of a variance in DNA concentration within the cell, the size of a region occupied by DNA within the cell, and a maximal concentration of DNA within the cell.

102. The computer program product of claim 101, wherein the population of cells includes cells treated under control conditions.

103. The computer program product of claim 101, wherein the population of cells includes a first set of cells treated with a first concentration of a biologically active agent and a second set of cells treated with a second concentration of the biologically active agent.

104. The computer program product of claim 103, wherein the population of cells further includes a third set of cells treated under control conditions.

105. The computer program product of claim 101, wherein the code for determining said parameters for classifying the cells into stages of the cell cycle comprises code for applying a mixture model to the organization of cell images.

106. The computer program product of claim 105, wherein the code for determining said parameters for classifying the cells into stages of the cell cycle comprises code for employing an expectation maximization fitting technique to the mixture model.

107. The computer program product of claim 101, wherein said parameters for classifying the cells into stages of the cell cycle allow classification of cells into at least the following stages: $G_1$, S, $G_2$, and mitotic.

108. The computer program product of claim 101, wherein said parameters for classifying the cells into stages of the cell cycle allow classification of cells into at least the following stages: $G_1$, S, $G_2$, and pre-anaphase mitotic and post-anaphase mitotic.

* * * * *